(12) United States Patent
Durrett

(10) Patent No.: US 9,365,254 B1
(45) Date of Patent: Jun. 14, 2016

(54) MOBILITY SCOOTER

(71) Applicant: Richard Leo Durrett, New Lisbon, WI (US)

(72) Inventor: Richard Leo Durrett, New Lisbon, WI (US)

( * ) Notice: Subject to any disclaimer, the term of this patent is extended or adjusted under 35 U.S.C. 154(b) by 0 days.

(21) Appl. No.: 14/587,073

(22) Filed: Dec. 31, 2014

Related U.S. Application Data

(60) Provisional application No. 61/925,344, filed on Jan. 9, 2014.

(51) Int. Cl.
*B62K 13/08* (2006.01)
*B62K 5/023* (2013.01)
*B62K 13/06* (2006.01)
*B62K 5/025* (2013.01)
*B62J 1/08* (2006.01)
*B62K 27/12* (2006.01)
*B62K 15/00* (2006.01)

(52) U.S. Cl.
CPC . *B62K 13/08* (2013.01); *B62J 1/08* (2013.01); *B62K 5/023* (2013.01); *B62K 5/025* (2013.01); *B62K 13/06* (2013.01); *B62K 27/12* (2013.01); *B62J 2001/085* (2013.01); *B62K 2015/001* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,867,449 | A | * | 1/1959 | Shawver .................... B62B 5/00 180/11 |
| 3,249,171 | A | * | 5/1966 | Kinghorn ............... B62D 61/08 180/208 |
| 3,388,761 | A | * | 6/1968 | Arpin ..................... B62D 61/08 180/208 |
| 3,513,924 | A | * | 5/1970 | Jackson ................. B62K 5/025 180/14.1 |
| 3,513,926 | A | * | 5/1970 | Paget, Jr. .............. B62K 15/006 180/208 |

(Continued)

FOREIGN PATENT DOCUMENTS

| CH | 708860 A2 | * | 5/2015 | ............. B62K 13/08 |
|---|---|---|---|---|
| DE | 10248582 A1 | * | 5/2004 | ................ B62B 1/10 |

(Continued)

OTHER PUBLICATIONS

Free Rider, web page printout from unknown address, date unknown.

(Continued)

*Primary Examiner* — Nicole Verley
(74) *Attorney, Agent, or Firm* — Brannen Law Office, LLC

(57) ABSTRACT

The present invention relates to a mobility scooter and in particular to a mobility scooter having a base with a platform. The base further has a receiver at the front of the platform, a rear hitch, two risers with vertical holes for receiving chair legs and a rear axle. Two batteries and motors can be further provided. The chair can fold flat to either allow greater movement upon the platform or for storage. Multiple attachments can be provided, including a single wheel, a double wheel and coupler attachments. The attachments easily engage and are disengaged from the base. Several other attachments can also be provided, including side bars, handlebars and a car seat holder. Further, a movable throttle is provided.

18 Claims, 25 Drawing Sheets

(56) References Cited

U.S. PATENT DOCUMENTS

| | | | |
|---|---|---|---|
| 3,524,512 A | 8/1970 | Voeks et al. | |
| 3,575,250 A | 4/1971 | Dykes | |
| 3,757,882 A * | 9/1973 | Honda | B62K 15/00 180/208 |
| 4,037,678 A * | 7/1977 | Braune | B62D 53/04 180/11 |
| 4,096,920 A | 6/1978 | Heyn | |
| 4,203,612 A * | 5/1980 | Feikema | B62K 13/04 280/278 |
| 4,452,327 A * | 6/1984 | Mowat | B62K 5/025 180/11 |
| 4,503,925 A * | 3/1985 | Palmer | A61G 5/047 180/13 |
| 4,534,438 A * | 8/1985 | Mowat | B62K 5/025 180/209 |
| 4,548,423 A * | 10/1985 | Craven | B60D 1/00 280/204 |
| 4,757,868 A * | 7/1988 | Cresswell | B62K 5/025 180/11 |
| 4,771,840 A | 9/1988 | Keller | |
| 4,944,360 A * | 7/1990 | Sturges | B62D 61/08 180/208 |
| 4,947,955 A * | 8/1990 | Hopely, Jr. | B62D 61/08 180/208 |
| 5,307,889 A * | 5/1994 | Bohannan | B62D 51/008 180/13 |
| 6,176,337 B1 * | 1/2001 | McConnell | B62D 1/14 180/208 |
| 6,702,313 B2 | 3/2004 | Forshee et al. | |
| 7,040,645 B1 * | 5/2006 | Borneman | B60D 1/52 280/491.5 |
| 7,093,841 B2 | 8/2006 | Conrad | |
| 7,124,849 B2 * | 10/2006 | Huang | B60N 2/22 180/208 |
| 7,125,080 B1 * | 10/2006 | Jarema, III | B60N 2/3011 297/378.1 |
| 7,207,407 B2 | 4/2007 | Huber | |
| 7,234,557 B2 * | 6/2007 | Chen | B62K 5/025 180/208 |
| 7,654,356 B2 * | 2/2010 | Wu | B62K 5/025 180/208 |
| 7,780,184 B2 * | 8/2010 | Ehrenreich | B62B 7/12 280/202 |
| 7,992,889 B2 * | 8/2011 | Ehrenreich | B62B 7/12 280/202 |
| 8,573,625 B2 * | 11/2013 | Gramme | B62K 5/025 280/204 |
| 8,695,992 B2 * | 4/2014 | Piaget | B62B 5/0079 280/1.5 |
| 8,776,932 B1 * | 7/2014 | Bussinger | B62K 15/006 180/208 |
| 2015/0054252 A1 * | 2/2015 | Lee | B62K 5/025 280/276 |
| 2015/0137481 A1 * | 5/2015 | Manternach | B62K 5/007 280/400 |
| 2015/0250666 A1 * | 9/2015 | Hoffmann | B62K 5/025 180/15 |

FOREIGN PATENT DOCUMENTS

| | | | | |
|---|---|---|---|---|
| DE | 102009023919 A1 * | 12/2010 | | B60K 1/00 |
| DE | 202014005627 U1 * | 7/2014 | | B62K 7/04 |

OTHER PUBLICATIONS

Z-Cart, Z-Cart becomes an electric scooter to move around those massive stores, web page printout from unknown address, date unknown.

RJ Cox, Liberty Elite Foldable Mobility Scooter, web page printout from www.rjcox.com.au/ecms/product.asp?pid=5866&cid=0, as viewed on Dec. 6, 2013.

Mobility 4 U, TravelScoot Mobility Scooter, web page printout from www.mobility4u.com.za/travelscoot-mobility-scooter/#!prettyPhoto, as viewed on Dec. 6, 2013.

* cited by examiner

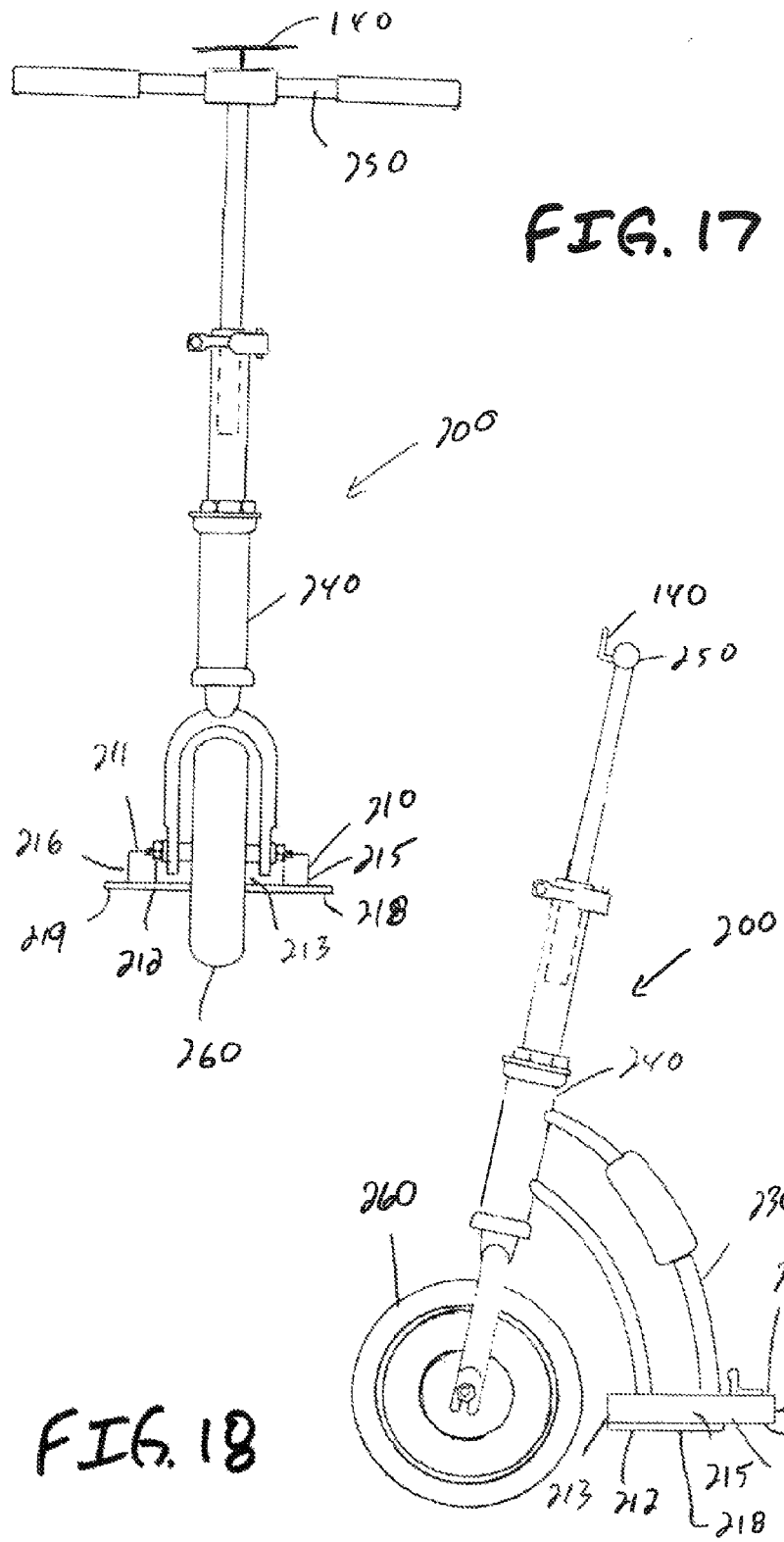

MOBILITY SCOOTER

This United States utility patent application claims priority on and the benefit of provisional application 61/925,344 filed Jan. 9, 2014, the entire contents of which are hereby incorporated herein by reference.

BACKGROUND OF THE INVENTION

1. Field of the Invention

The present invention relates to a mobility scooter and in particular to a mobility scooter having easily changeable attachments at the front end of the base, that is configurable for tandem use and that has easily removable components for easy storage.

2. Description of the Related Art

One product, named Liberty Elite Foldable Mobility Scooter is made by R.J. Cox Engineering.

Several US Patents are listed below.

United States Patent Number ("USPN") U.S. Pat. No. 2,867,449 to Shawver is titled Hand Cart Adapted for Use with Interchangeable Load Carriers. This patent shows an invention related to a vehicle and more particularly to a vehicular unit especially useful by itself or in association with a propelling unit, and finds particular utility in a vehicular train of relatively small size useful in coping with the care of lawns, gardens and the like as well as in the handling and transporting of materials in plants, shops, etc.

U.S. Pat. No. 3,524,512 to Coeks et al. is titled Self-Propelled Driving and Steering Truck for Shopping Carts. This patent describes a self-propelled truck including a rear operators position and front steerable wheel means, the cart including a forward portion adapted to be disposed beneath and to support the rear portion of a shopping cart with the rear wheels of the shopping cart in at least slightly elevated position above the ground whereby the self-propelled truck may be utilized to propel and steer the shopping cart.

U.S. Pat. No. 3,575,250 to Dykes is titled Self-Propelled Electric Vehicle and Battery Mount. It describes a self-propelled electric vehicle includes a wheeled frame having a quick connect and disconnect hitch for drivingly connecting the vehicle to a variety of wheeled devices. An individual drive for each of a pair of ground-contacting wheels includes a separate, reversible motor and a power transmission train coupled to each wheel which carries an inturned extension over which a transmission member is trained. The motors are mounted on a pivotal base and yieldingly urged away from the wheels to maintain tension in the power transmission train during rotation of the wheels by the motors. A mount for the quick replacement of a battery on the vehicle with a recharged battery has a carrier member on the battery casing and electrical contacts arranged to removably seat on electrically conductive support members carried by the vehicle which are arranged to form power terminals on the vehicle.

U.S. Pat. No. 4,096,920 to Heyn is titled Power Shopping Cart and Trailer. It teaches a self-propelled shopping cart, having a trailer accommodation for transporting a passenger behind the cart, and further comprising a brake feature wherein a tilting trailer is used for automatic drive and brake control. An operator can tilt the trailer to the rear to apply a brake means or forward to engage a drive means. A basket of the cart can be removed and replaced by a seat and back rest through the use of a quick release cam locking device and the trailer can be placed in an upright, stowed position so that the cart may be used in the conventional manual push mode.

U.S. Pat. No. 4,771,840 to Keller is titled Articulated Power-Driven Shopping Cart. It shows an articulated shopping cart-tractor unit with a seat is provided for the handicapped. The tractor unit is connected to a conventional shopping cart by a bracket and coupling.

U.S. Pat. No. 6,702,313 to Forshee et al. is titled Wheelchair Attachable Shopping Cart. It shows a shopping cart is securely attachable to the foot rest supports of a wheel chair in a manner allowing a person to enter and depart the wheelchair while the cart is attached. Two attachable arms that are moveable horizontally and vertically attached to the each foot rest support in a low position. The horizontally and vertically movement of the attachable arms permit the cart to be attached to different wheelchairs. The attachable arms have ends that are easily attached and detached from the foot rest supports. In one embodiment, the attachment arms have a U-shaped end that fits around the foot rest support and is held in place by a strap, the ends of which may be secured by any one of buckles, snaps and hook and loop fasteners.

U.S. Pat. No. 7,093,841 to Conrad is titled Seating/Storage Add-On Section With Holster for Shopping Cart. It has a seating/storage add-on section for use with a shopping cart, having a non-rigid connector for engaging the rear wheels of a shopping cart. In addition, the connector allows relative movement between the add-on section and an attached shopping cart. The shopping cart can be quickly attached to and detached from the add-on section without requiring tools.

U.S. Pat. No. 7,207,407 to Huber is titled Quick Disconnect Support Bracket for a wheeled Device. It has a collapsible three wheeled vehicle for personal transportation which has a removable support bracket that secures the distal ends of two independent foldable side rails at either end of the support bracket. The support bracket also provides a mounting base for a passenger seat. The rear support bracket, when removed, allows the side rails to fold together with the steering column for convenient storage. A removable front wheel, a removable seat, and removable steering handles allow the vehicle to further reduce the required amount of space for storage and transport. The vehicle uses a battery operated electric drive motor. A second optional battery power supply may be attached to the vehicle to extend its range. A storage bag is provided to hold the components of the vehicle when not in use.

While each of these products may work well for their intended purposes, they each can be improved upon.

For example, none show the use of interchangeable front ends.

None show a front end receiver of the present invention.

None show a chair that folds flat.

None show a hooked end configured for multiple heights.

None show a movable throttle.

None show independent rear drive assemblies that are removably supported on the platform and are connected to independent wheels.

Thus there exists a need for a mobility scooter that solves these and other problems.

SUMMARY OF THE INVENTION

The present invention relates to a mobility scooter and in particular to a mobility scooter having a base with a platform. The base further has a receiver at the front of the platform, a rear hitch, two risers with vertical holes for receiving chair legs and a rear axle. Two batteries and motors can be further provided. The chair can fold flat to either allow greater movement upon the platform or for storage. Multiple attachments can be provided, including a single wheel, a double wheel and coupler attachments. The attachments easily engage and are disengaged from the base. Several other attachments can also be provided, including side bars, handlebars and a car seat holder. Further, a movable throttle is provided.

According to one advantage of the present invention, the scooter has a base with a receiver at the front of a platform. The receiver is shaped to receive a connector of one of several attachments. The connection between the connector and the receiver is made without the need for tools. The weight of the scooter advantageously maintains the connection between the scooter and attachment. Since all parts are relatively light, the scooter can be assembled and disassembled by a single person.

According to another advantage of the present invention, the scooter has many interchangeable front ends, including a single wheel attachment, a double wheel attachment and a coupler attachment. These three attachments advantageously allow the present invention to be useful in many situations, including (but not limited to) use as a three wheel scooter, use as a four wheel mover, use as a scooter attached to a shopping cart or use in tandem with another scooter.

According to a further advantage of the present invention, a chair is provided that is movable both longitudinal and elevationally relative to the platform. This is accomplished in one embodiment by having multiple holes formed in risers on the platform. In this one embodiment, the riser holes are spaced apart and are located in increased heights moving towards the rear of the platform. This advantageously allows taller people more longitudinal and vertical leg room when necessary.

According to a further advantage yet of the present invention, the chair has a seat that folds flat. The seat can fold flat during use (to allow the user more room on the platform when standing) or during storage (low profile for being stored in a trunk of a car).

According to a still further advantage yet of the present invention, the coupler attachment can have a plurality of hooks that change the effective height of the hook. This advantageously allows the user to easily determined the proper hook for use to maintain the platform as close to level (with the ground) as possible. In a preferred embodiment, the user can easily change between hooks by swiveling a link about a support end. The hook then can be used to rest upon an adjacent structure to link the scooter with the adjacent structure.

According to a still further advantage yet of the present invention, multiple scooters can be joined in a tandem fashion. This advantageously allows for companions to each have their own scooter.

According to a still further advantage yet of the present invention, the scooter can either include a drive assembly or be used as a push cart. For example, when used as a push cart, the present invention can be useful as a stroller (with a car seat attachment). Straight bars or handle bars can be included and attached to the present invention to aid in operation thereof.

According to a still further advantage yet of the present invention has a throttle that is easily movable to multiple positions. For example, the throttle can be used on the bars for left hand or right hand operation (by rotating of the throttle body). The throttle is also positional on the base of the platform for operation by a person's foot.

According to a still further advantage yet of the present invention, independent drive assemblies can be provided. In this regard, the two wheels of the scooter are independently powered and a differential effect is provided when turning the scooter.

According to a still further advantage yet of the present invention, mating gears between each drive assemblies and each respective wheel is provided. This allows the drive assemblies to be easily connected to the wheels when properly positioned on the platform.

Other advantages, benefits, and features of the present invention will become apparent to those skilled in the art upon reading the detailed description of the invention and studying the drawings.

BRIEF DESCRIPTION OF THE DRAWINGS

FIG. 17 is an end view of a preferred attachment of the present invention.

FIG. 18 is a side view of the embodiment illustrated in FIG. 17.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 1:
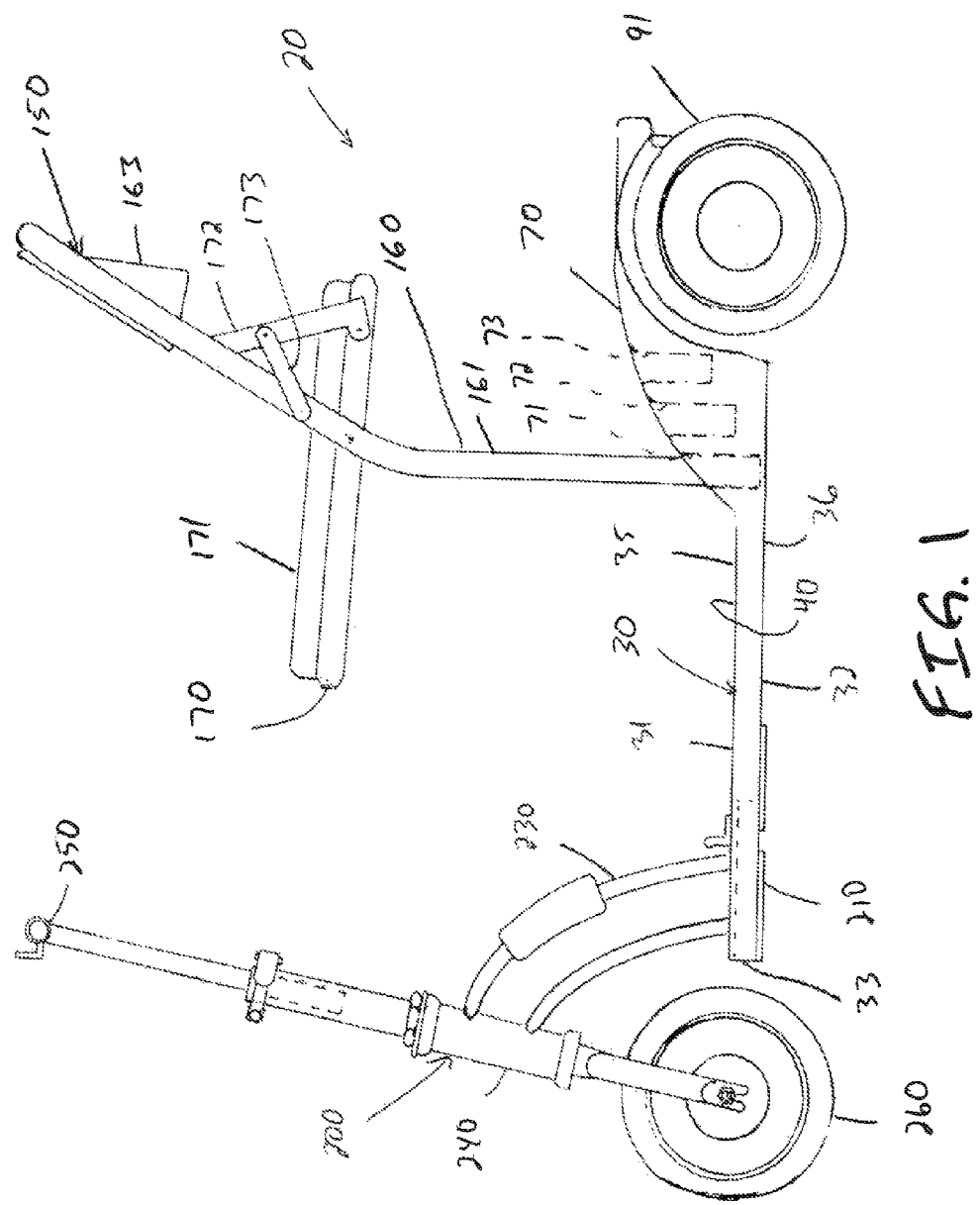
FIG. 1 is a side view of an embodiment of the present invention.
Figure 2:
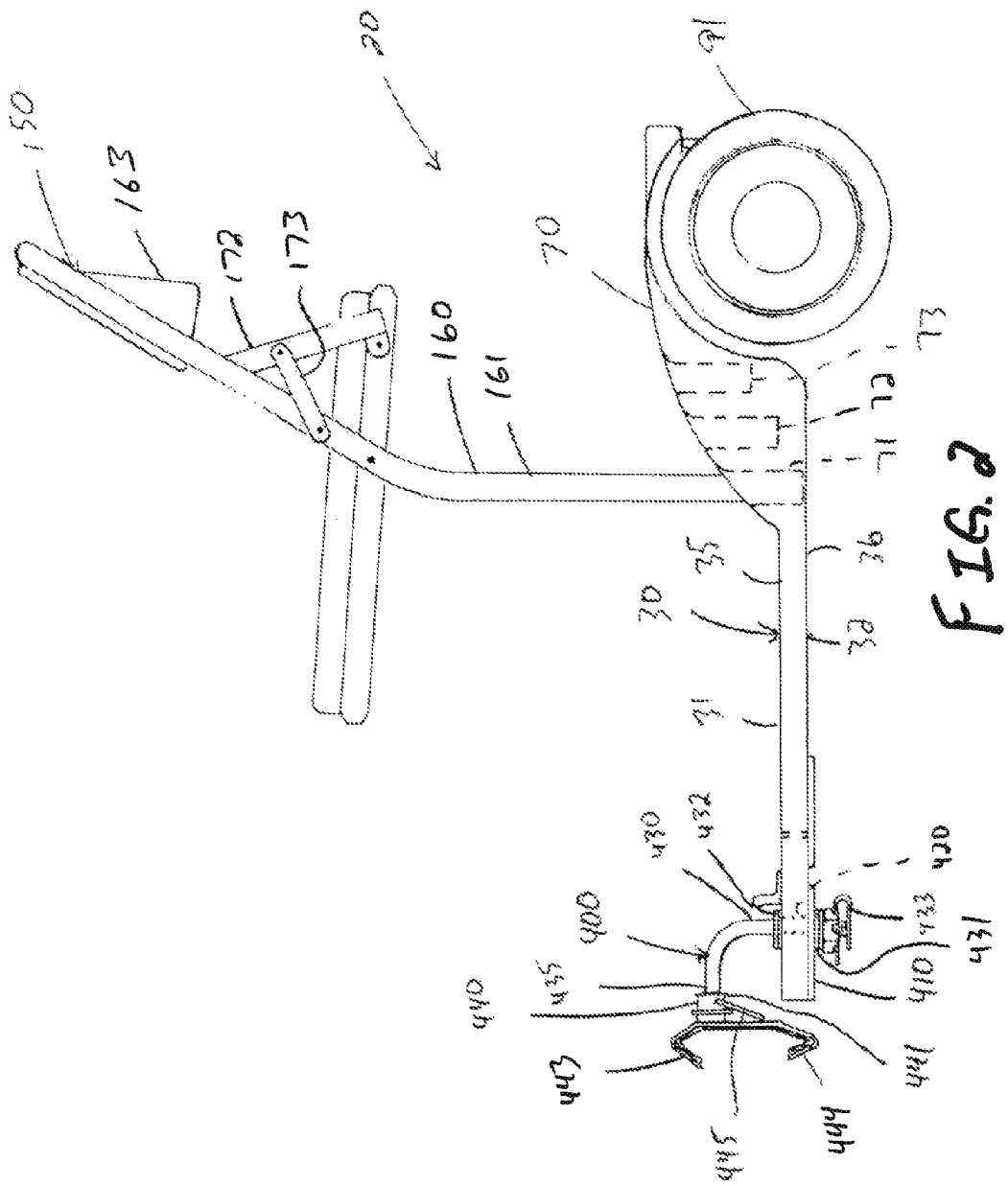
FIG. 2 is a side view of an alternative embodiment of the present invention.
Figure 3:
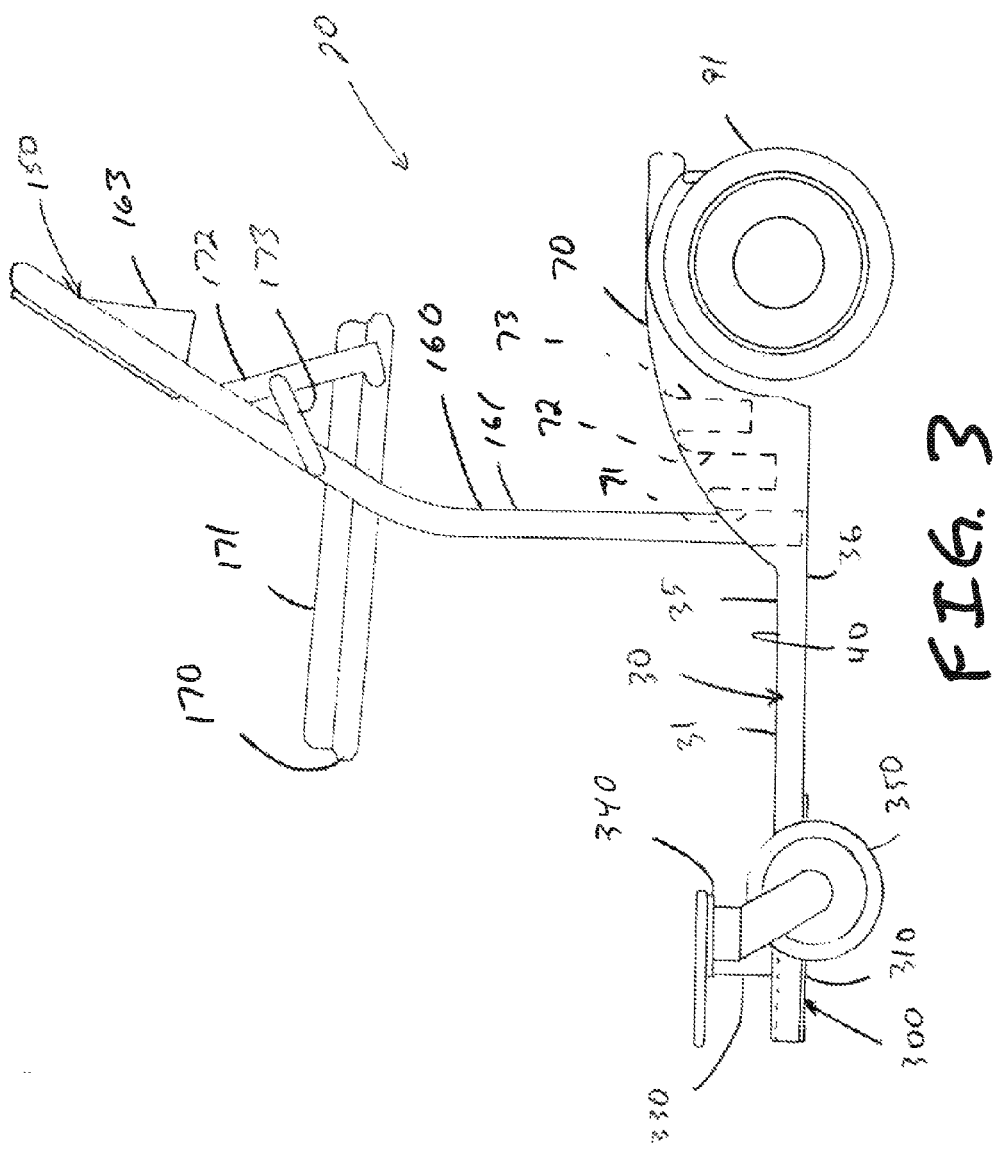
FIG. 3 is a side view of an additional alternative embodiment of the present invention.
Figure 53:
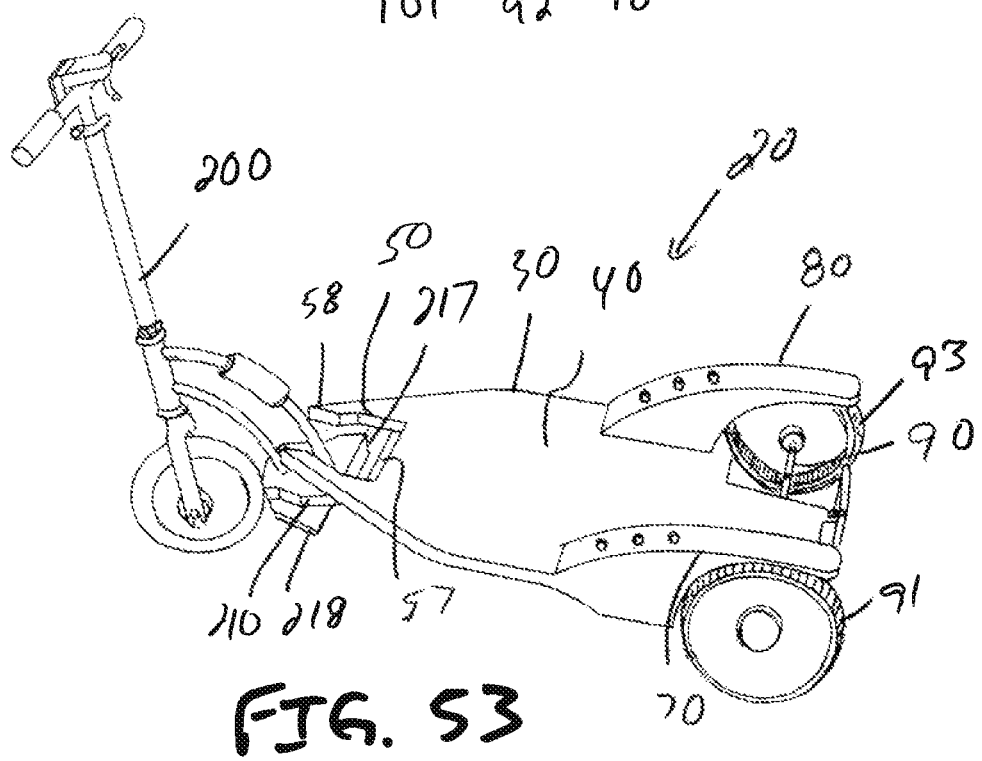
FIG. 53 is a perspective view of an attachment in an intermediate position relative the base.

Turning now to FIGS. 1-53, it is seen that many preferred embodiments of the present invention are shown. While certain features are shown in only limited numbers of figures, it is appreciated that many elements of the present invention are interchangeable.

Figure 48:
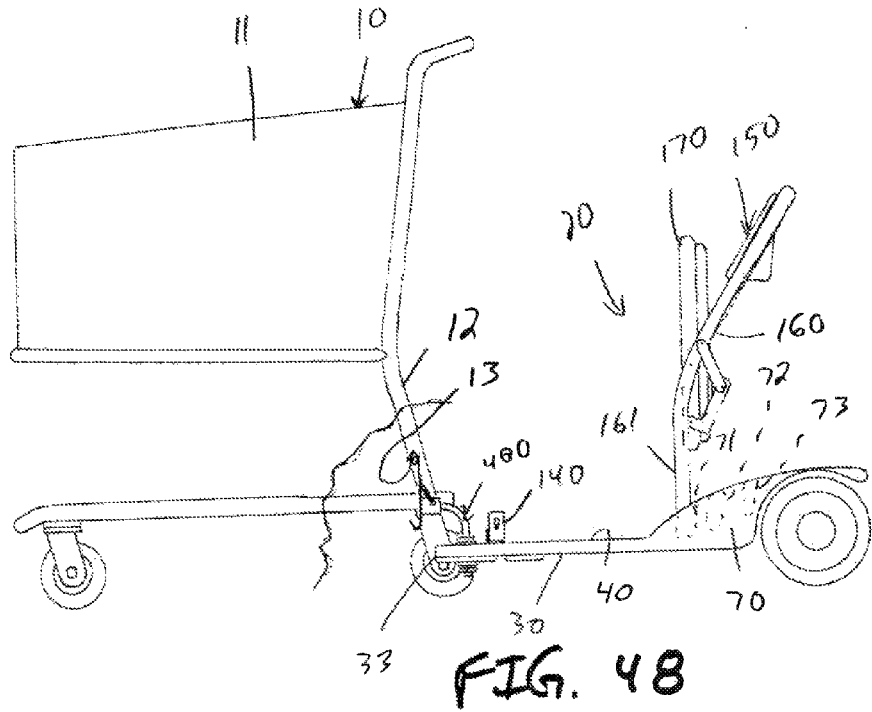
FIG. 48 is a side view of an alternative configuration of the present invention.
Figure 49:
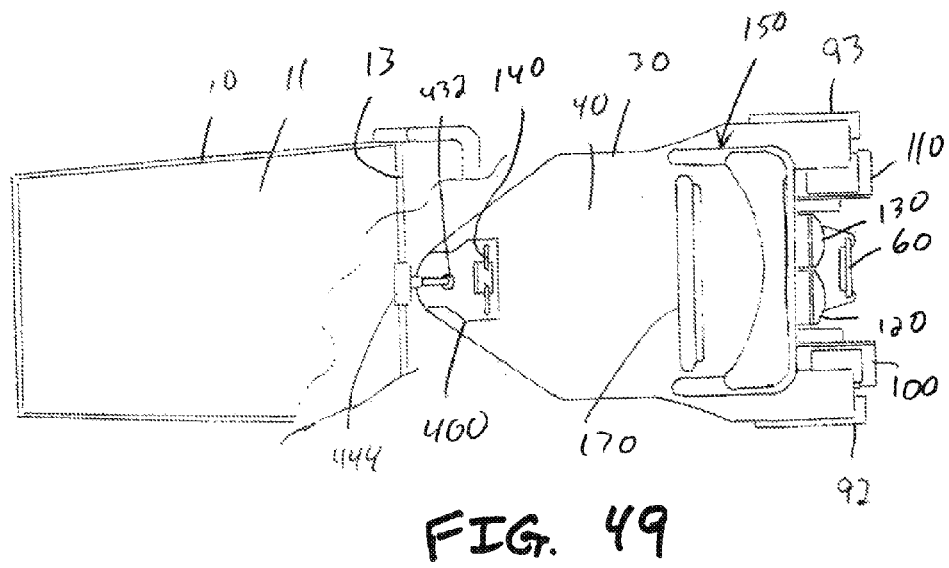
FIG. 49 is a top view of the embodiment illustrated in FIG. 48.

The scooter of the present invention can be used with a cart 10, such as shopping cart. The cart 10 typically has a body 11 that rests on a frame 12. The frame 12 typically has a cross bar 13 at the rear of the cart 10. The present invention is designed for use with carts of many shapes and sizes. One such cart is illustrated below in FIGS. 48 and 49.

The present invention comprises a scooter 20. The scooter 20 has a base 30 and an attachment (many attachment embodiments are described herein). The base supports many components as described herein.

Turning now to FIGS. 1-8, 13 and 25, it is seen that a preferred embodiment of a base 30 is illustrated. The base 30 has a top 31, a bottom 32, a first end 33, a second end 34, a first side 35 and a second end 36. The top 31 of the base defines a platform 40. A gauge 41, such as an operational status display (power remaining, peak power, drive assembly status, etc.) can be provided on the platform.

End 33 of the base preferably has a tapered shape, wherein the sides narrow relative each other adjacent the end 33 of the base.

Figure 9:
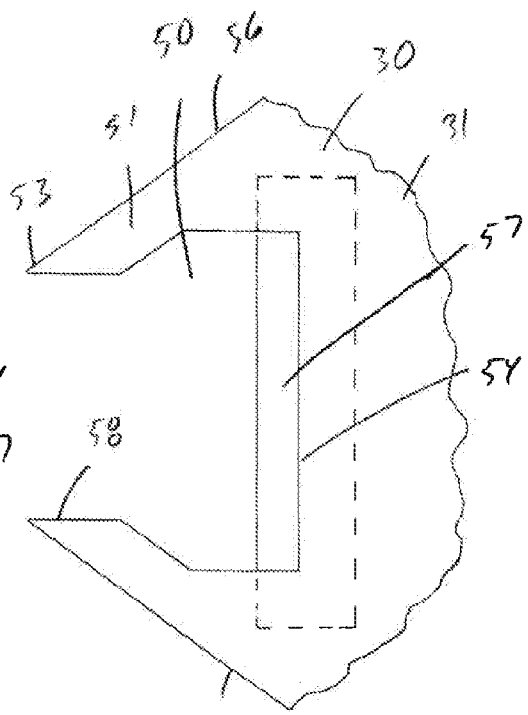
FIG. 9 is a partial top view of the front end of a platform.
Figure 12:
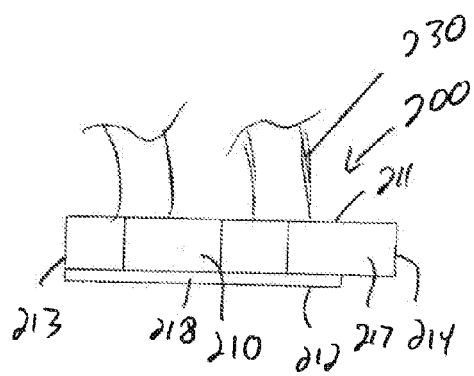
FIG. 12 is a side view of an attachment.
Figure 11:
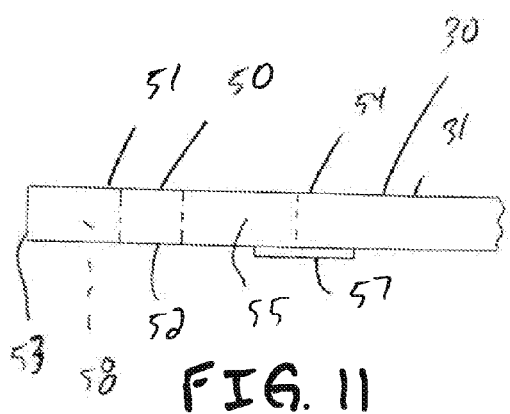
FIG. 11 is a partial side view of a platform.

A receiver 50 is located at end 33 of the base 30, and is illustrated in FIGS. 9 and 11. The receiver has a top 51, a bottom 52, an end 53, a second end 54, a side 55 and a second side 56. A lip 57 is further provided. The lip 57 is preferably located on the bottom 52 of the receiver at end 54. It is preferred that the lip be formed of a thin flat plate of rigid material that spans between the sides 55 and 56 at the end 54 of the receiver. A neck 58 is at the front of the end. The neck 58 is formed by a reduction in receiver width at end 53 of the receiver 50. The receiver 50 is preferably open to the end 33 of the base 30.

Figure 5:
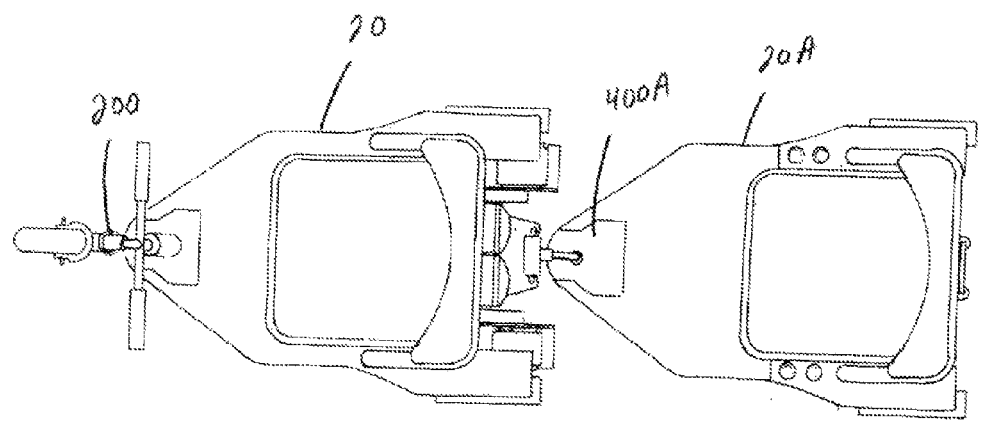
FIG. 5 is a top view of the embodiment illustrated in FIG. 4.
Figure 6:
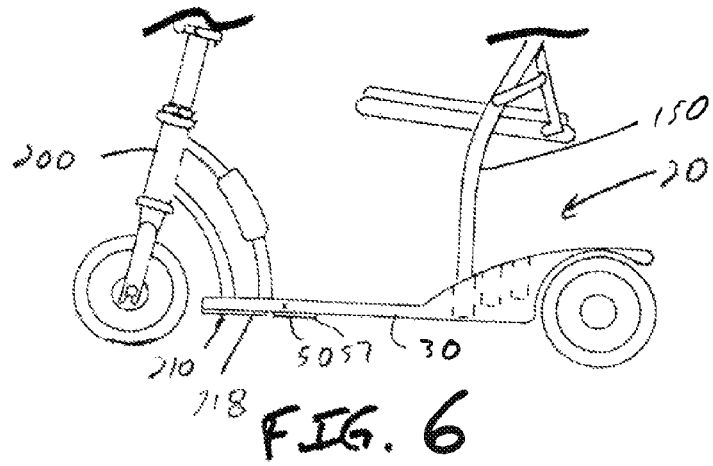
FIG. 6 is a side view of an embodiment of the present invention with a front end attached to a platform.
Figure 7:
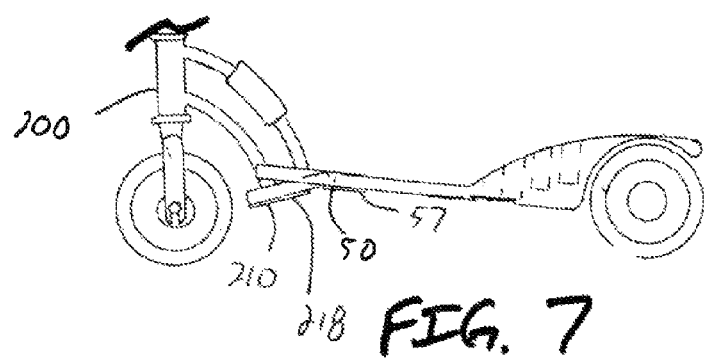
FIG. 7 is similar to FIG. 6 but shows the front end partially disengaged from the platform.
Figure 8:
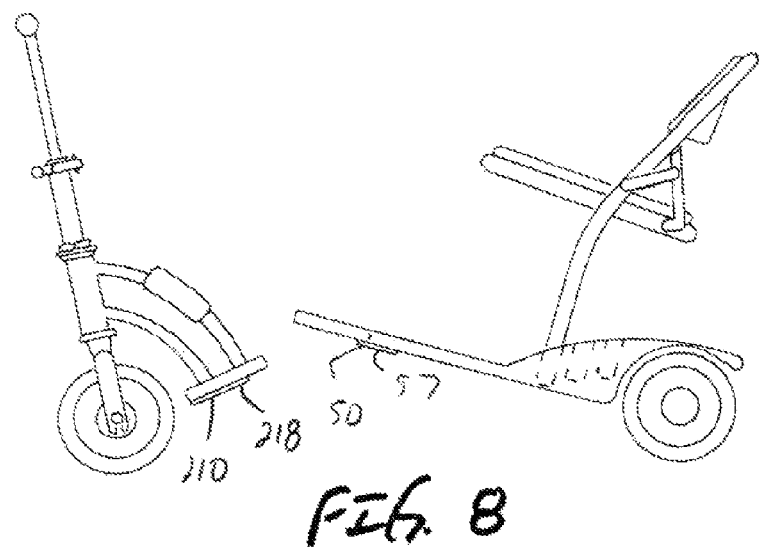
FIG. 8 is similar to FIGS. 6 and 7, but shows the front end fully disengaged from the platform.
Figure 10:
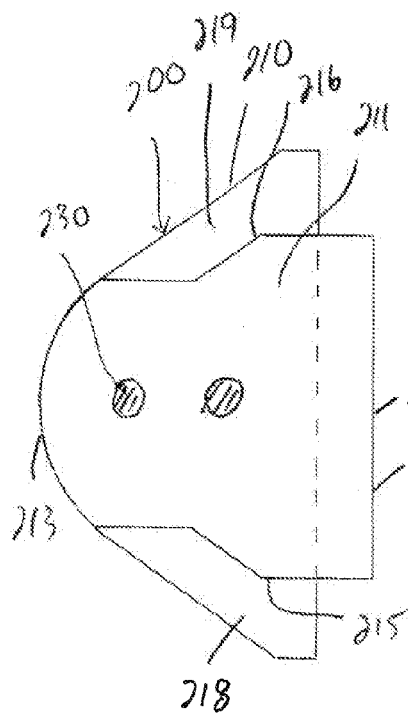
FIG. 10 is a top view of an attachment.
Figure 25:
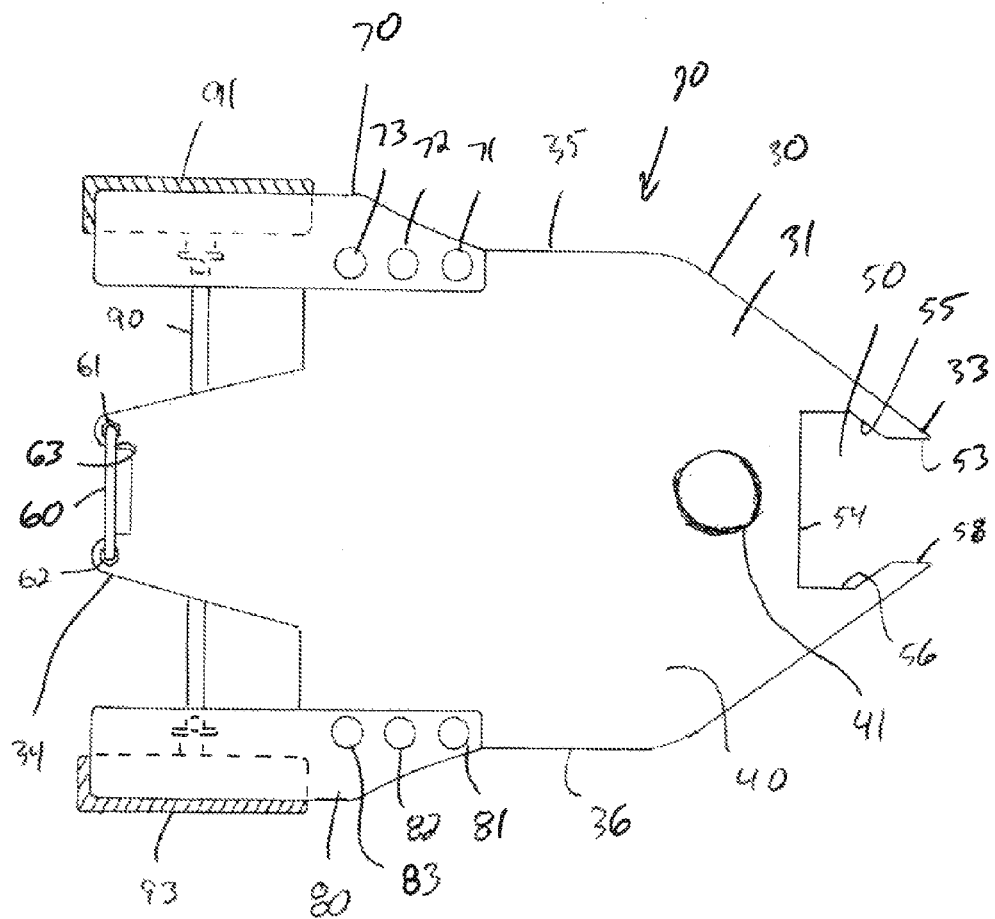
FIG. 25 is a top view of a platform of the present invention.

A hitch 60 is preferably located at end 34 of the base 30, as can be seen in FIGS. 5 and 25. The hitch 60 has two uprights 61 and 62. A cross bar 63 spans between the uprights elevated a selected amount from the top of the platform 40. One preferred height is approximately 3.5 inches from the top of the platform. However, other heights may be used without departing from the broad aspects of the present invention.

A riser 70 is provided, and is seen in FIGS. 1-5, 13 and 25. Riser 70 has three vertically oriented holes 71, 72 and 73 therein. Each hole has a preferred depth of about 3 inches. Hole 72 is approximately 2 inches behind and approximately 1 inch higher than hole 71. Hole 73 is approximately 2 inches behind and approximately 1 inch higher than hole 72. In this regard, it is seen that a chair (described below) can be raised and moved rearwardly in discrete intervals.

A riser 80 is provided, and is seen in FIGS. 1-5, 13 and 25. Riser 80 is located opposite of riser 70. Riser 80 has three vertically oriented holes 81, 82 and 83 therein. Each hole has a preferred depth of about 3 inches. Hole 82 is approximately 2 inches behind and approximately 1 inch higher than hole 81. Hole 83 is approximately 2 inches behind and approximately 1 inch higher than hole 82. In this regard, it is seen that a chair (described below) can be raised and moved rearwardly in discrete intervals by revovably placing the bottom of the legs in selected riser holes. The sidewalls of the riser holes securely holds the chair in the vertical position.

In this regard, a preferred seating height of between 15 and 17 inches can be provided.

An axle 90 is provided at the rear of the scooter. A first wheel 91 with an internal gear 92 is at one end of the axle. A second wheel 93 with an internal gear 94 is at the opposite end of the axle. The gear 94 of the second wheel preferably has mirror image symmetry with gear 92 of wheel 91. Wheel 91 preferably turns independent of wheel 93.

Figure 26:
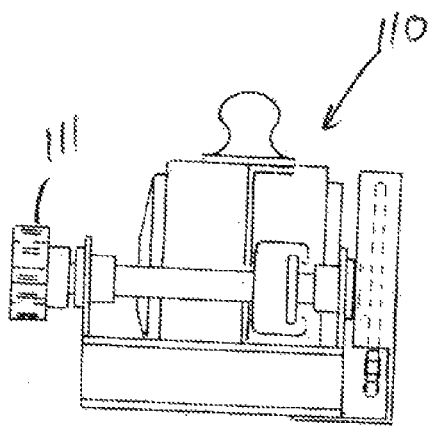
FIG. 26 is an end view of preferred embodiment of a motor of the present invention.
Figure 27:
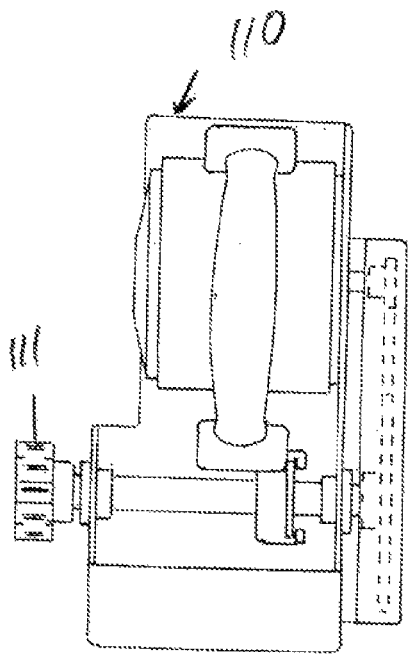
FIG. 27 is a top view of the embodiment illustrated in FIG. 26.
Figure 28:
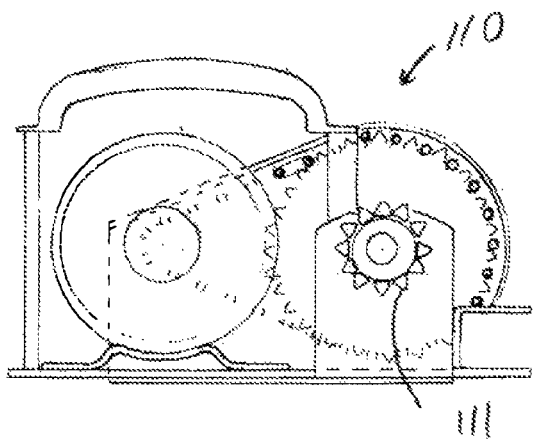
FIG. 28 is a side view of the embodiment illustrated in FIG. 26.
Figure 50:
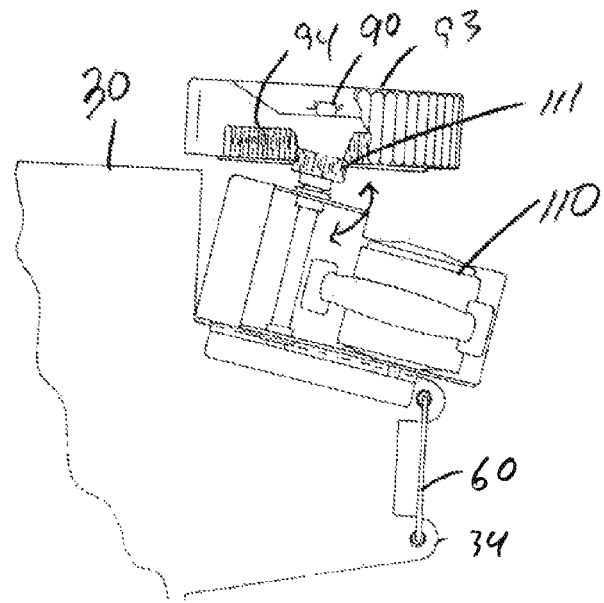
FIG. 50 is a view showing a drive assembly being positioned to mate with a wheel.
Figure 51:
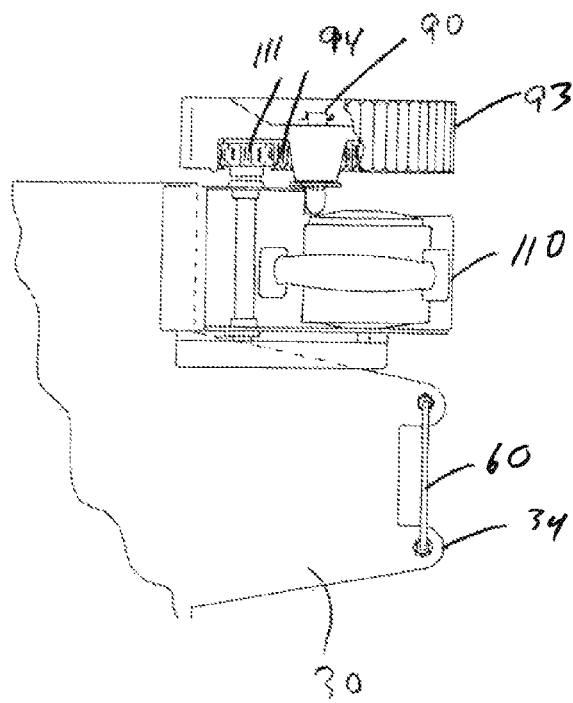
FIG. 51 is a top view showing the drive assembly mated with a wheel.
Figure 52:
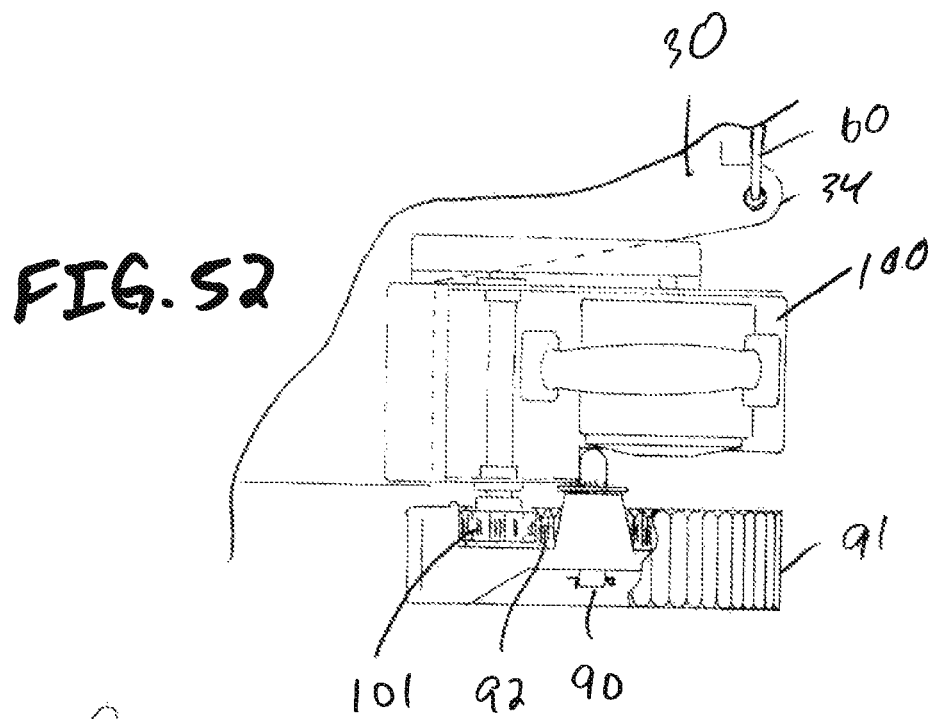
FIG. 52 is a top view showing a drive assembly mated with a wheel.

A drive assembly 100 is provided and is seen in FIGS. 26 to 28. The drive assembly has a motor, a chain and an external gear 101. Gear 101 mates with gear 92 to turn wheel 91. A second drive assembly 110 is further provided. The second drive assembly preferably has mirror image symmetry with drive assembly 100. The second drive assembly has a gear 111 that mates with the gear 94 of wheel 93. The individual drives allow for a differential to be created which is beneficial when turning wherein the wheels turn at different rotational rates. FIGS. 50 and 51 show the drive assembly 110 being swiveled or rotated to engage the wheel 93. FIG. 52 shows the drive assembly 100 engaging wheel 91.

Figure 29:
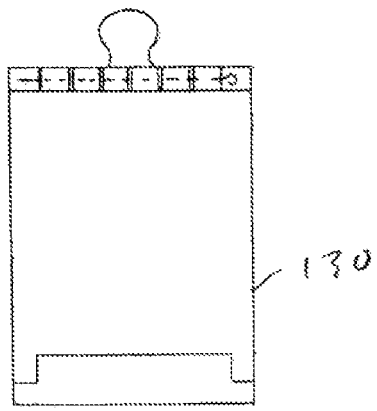
FIG. 29 is an end view of preferred embodiment of a battery pack of the present invention.
Figure 30:
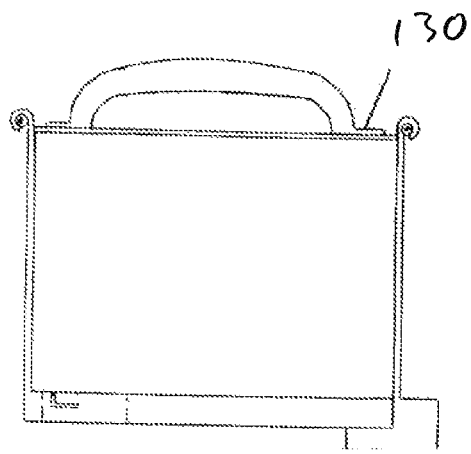
FIG. 30 is a side view of the embodiment illustrated in FIG. 29.
Figure 31:
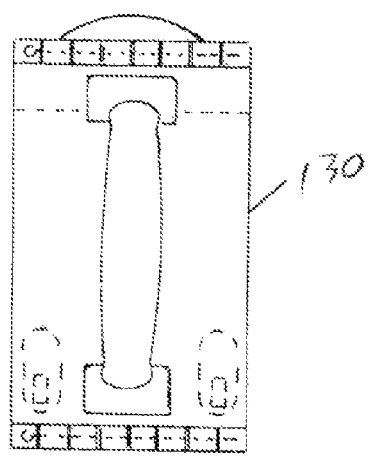
FIG. 31 is a top view of the embodiment illustrated in FIG. 29.

Battery 120 and battery 130 are provided for providing energy to drive assemblies 100 and 110, respectively. An embodiment of a preferred battery is shown in FIGS. 29-31.

A throttle 140 is further provided. The throttle 140 has a throttle body 141 and a lever 142. The lever 142 has sides 143 and 144. The throttle can be wired to the drive assemblies or wirelessly communicate with the drive assemblies. The throttle can be placed in several positions.

Figure 32:
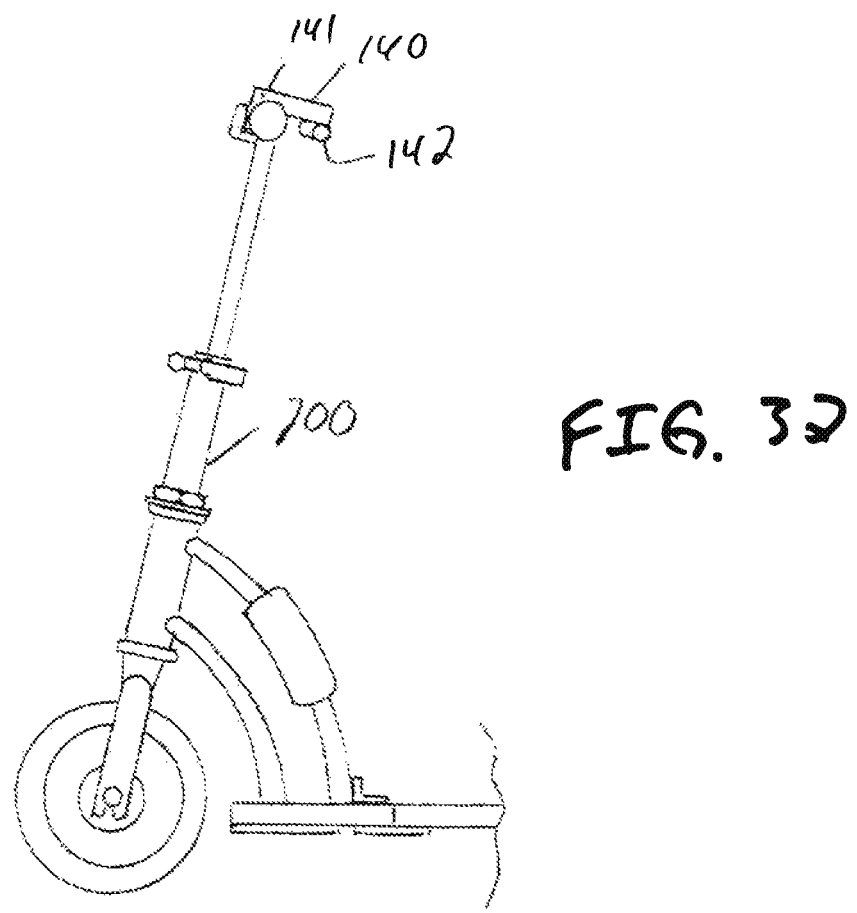
FIG. 32 is a side view of an embodiment of a throttle in a first position.
Figure 33:
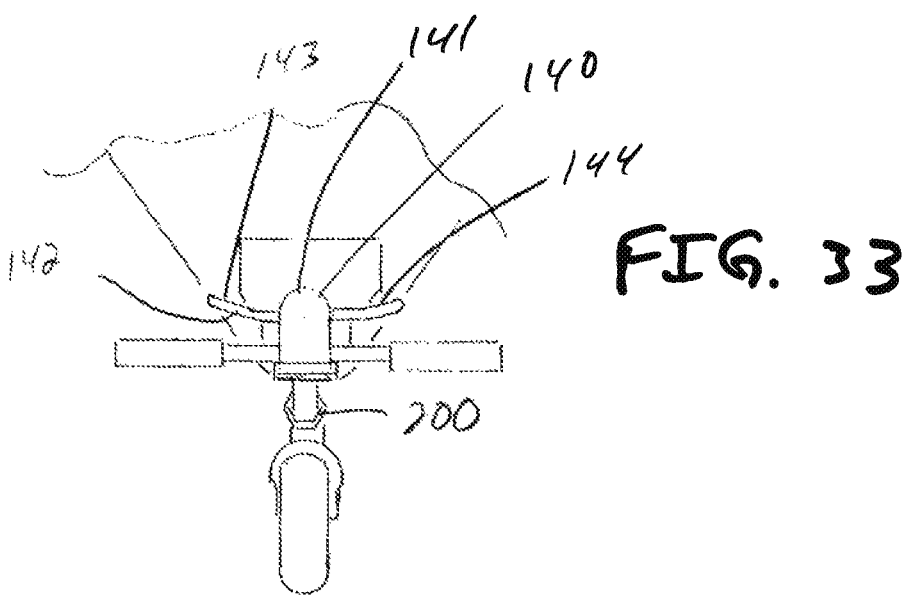
FIG. 33 is a top view of the embodiment illustrated in FIG. 32.
Figure 34:
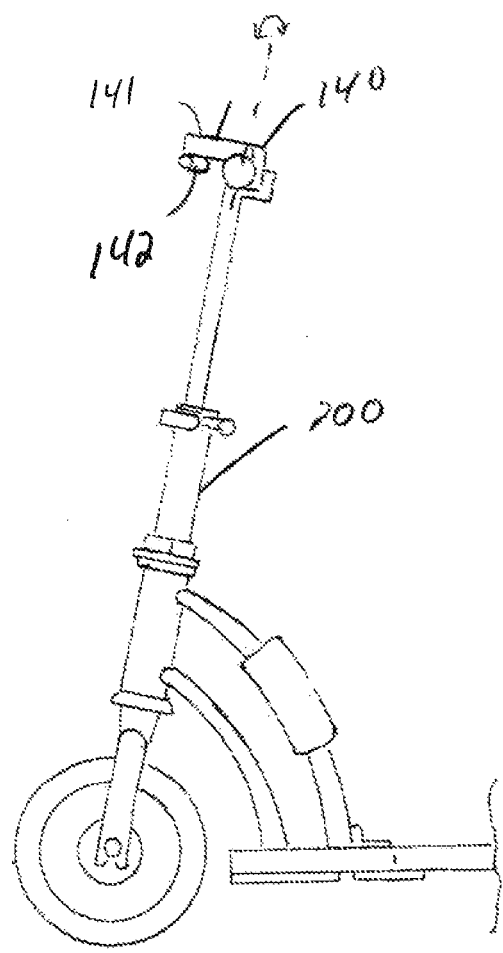
FIG. 34 is a side view of an embodiment of a throttle in a second position.
Figure 35:
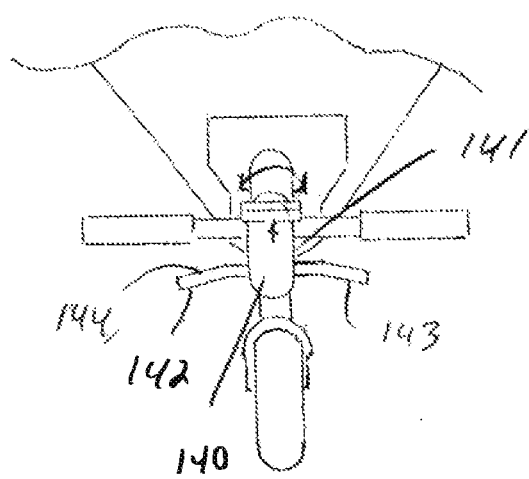
FIG. 35 is a top view of the embodiment illustrated in FIG. 34.
Figure 36:
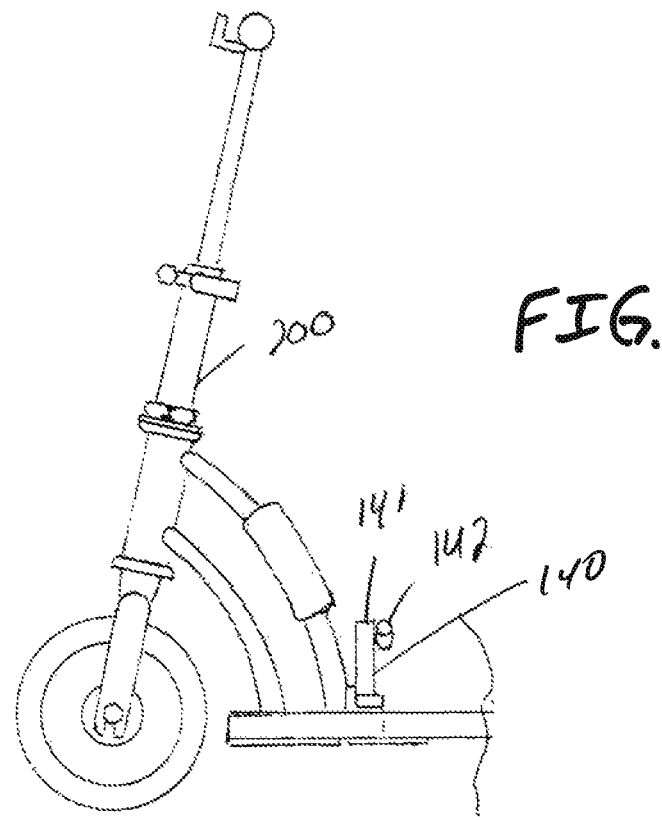
FIG. 36 is a side view of an embodiment of a throttle in a third position.
Figure 37:
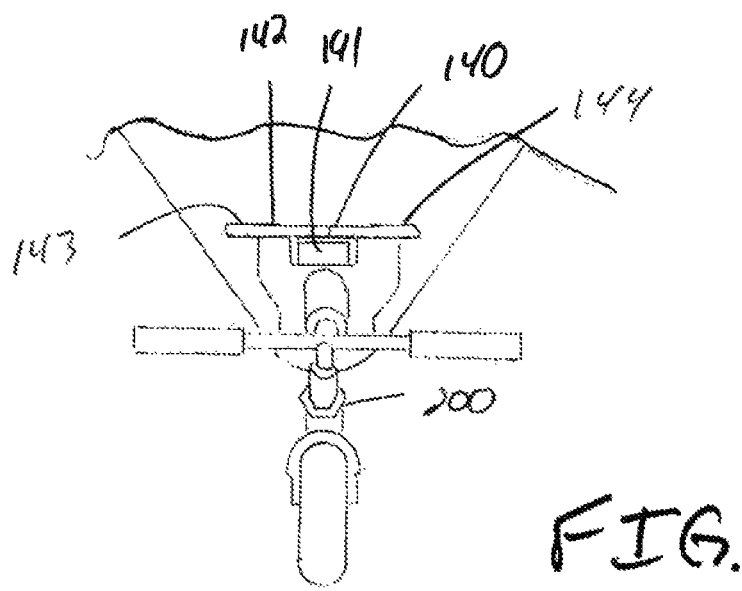
FIG. 37 is a top view of the embodiment illustrated in FIG. 36.

Three illustrative positions are shown in FIGS. 32-37. In FIGS. 32 and 33 the throttle is positioned for right handed use. Pulling lever side 143 towards the user will actuate the throttle 140. The throttle 140 (and bar 250) can be rotated about the post 240 as seen in FIGS. 34 and 35 for left handed use. In this regard, pulling lever side 143 toward the user will actuate the throttle. The throttle can also be placed by the feet of the user as seen in FIGS. 36 and 37. In this regard, the user can control the throttle with their feet. It is appreciated that other locations may be used without departing from the broad aspects of the present invention. Also, it is appreciated that alternative throttle structures could be used without departing from the broad aspects of the present invention.

Figure 13:
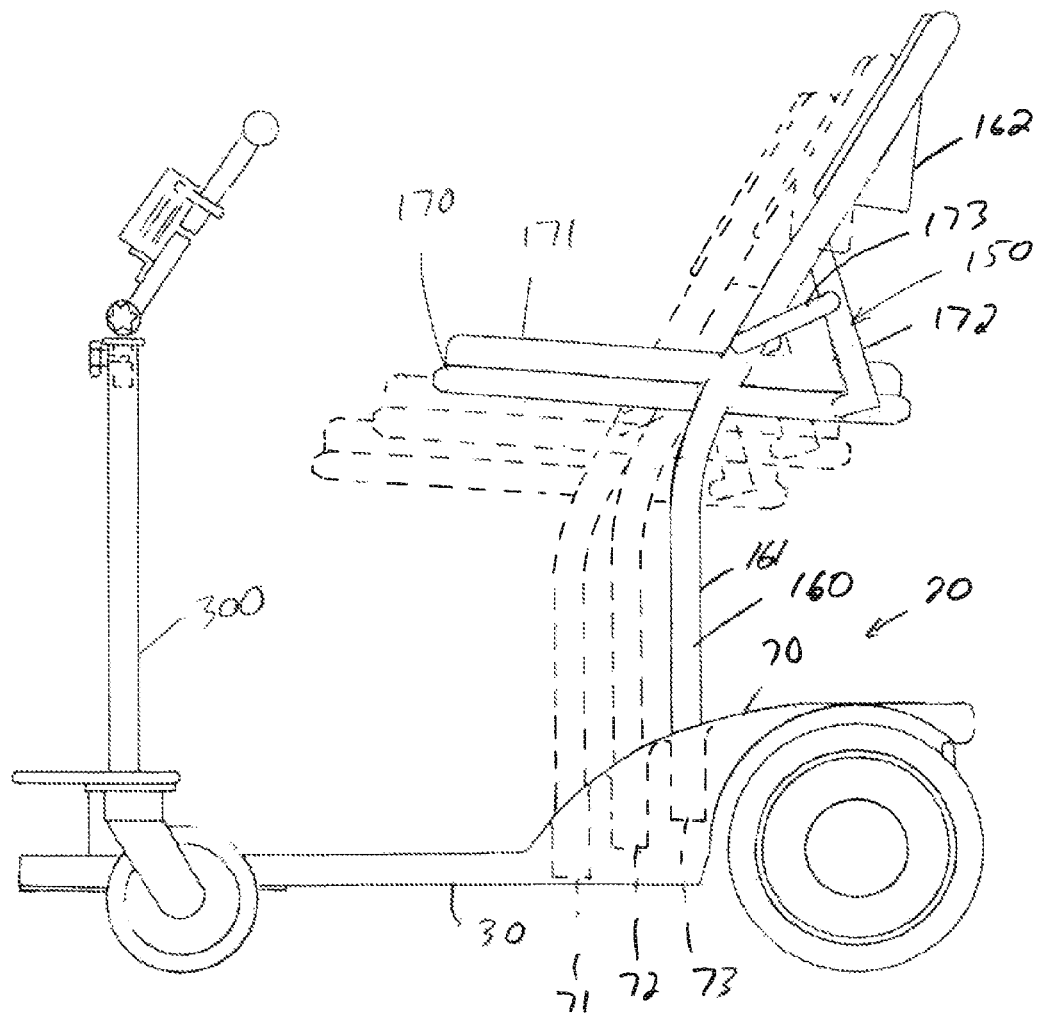
FIG. 13 is a side view of a preferred embodiment of the invention showing a chair in three alternative positions.
Figure 14:
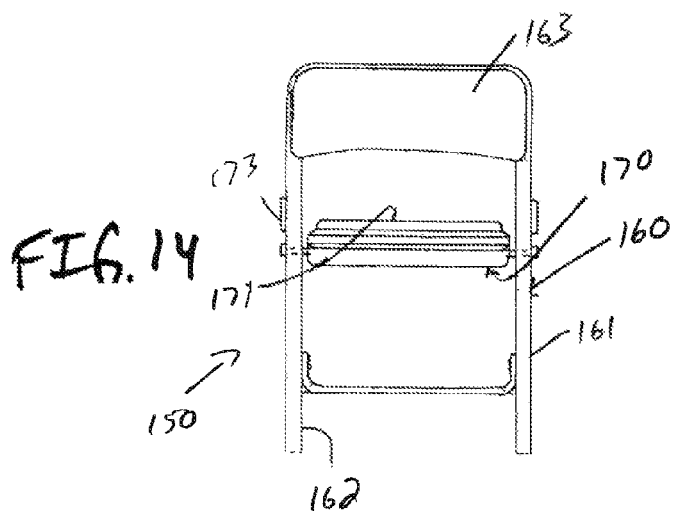
FIG. 14 is an end view of a chair of the present invention.
Figure 15:
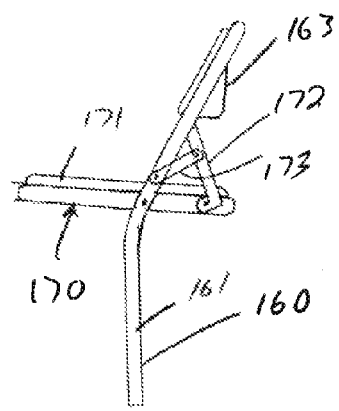
FIG. 15 is a side view of FIG. 14.
Figure 16:
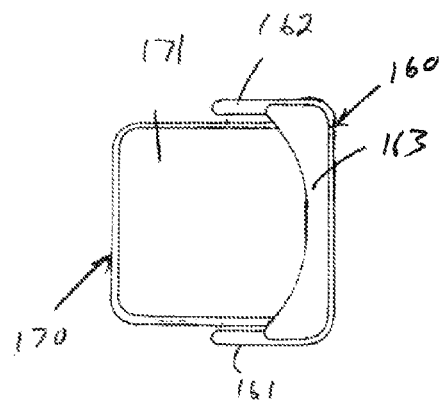
FIG. 16 is a top view of FIG. 14.
Figure 19:
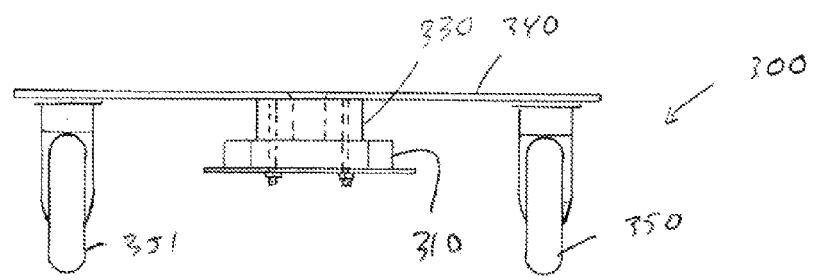
FIG. 19 is an end view of an additional preferred attachment of the present invention.
Figure 20:
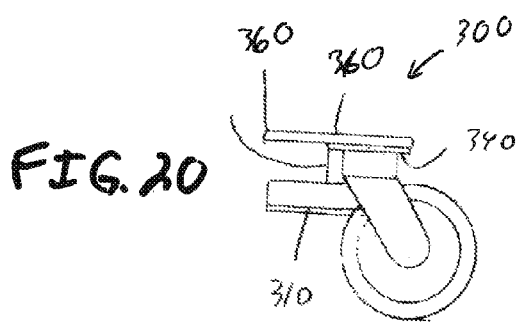
FIG. 20 is a side view of the embodiment illustrated in FIG. 19.
Figure 21:
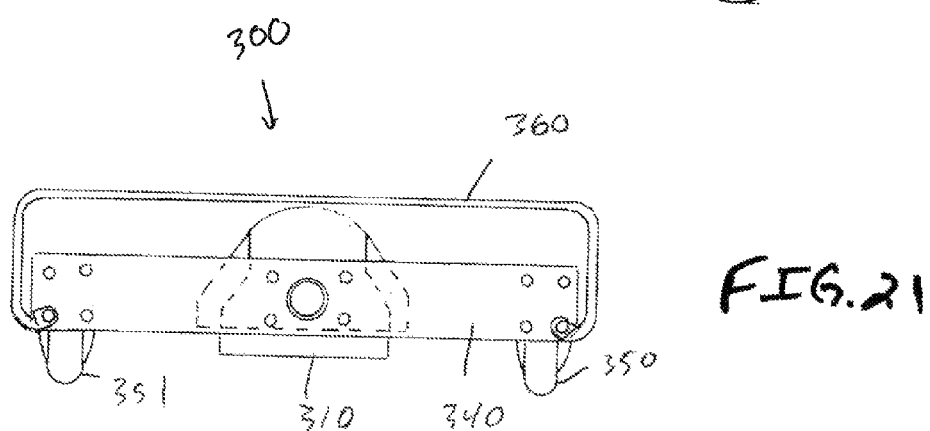
FIG. 21 is a top view of the embodiment illustrated in FIG. 19.
Figure 22:
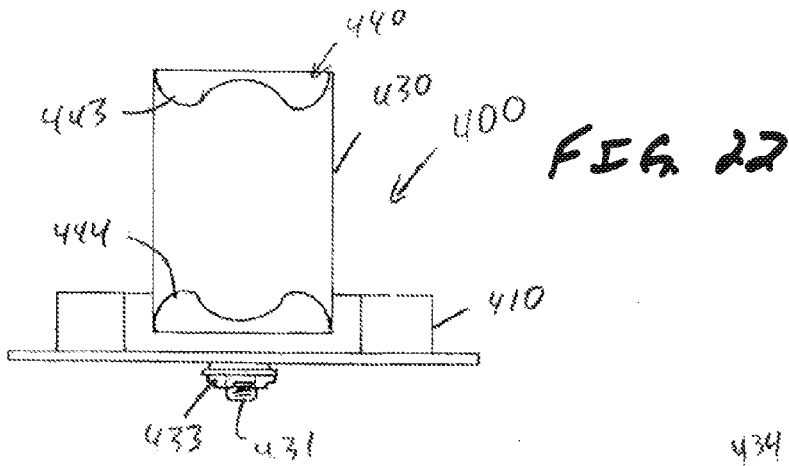
FIG. 22 is an end view of an additional preferred attachment of the present invention.

A chair 150 is further provided, as seen in FIGS. 1-5, 13, 14-16 and 48-49. The chair 150 has a base frame 160 comprising two legs 161 and 162. A back support 163 spans between the two legs 161 and 162. A seat frame 170 having a seat 171, and arm 172 and a support 173 is further provided. The seat frame 170 pivots between a deployed or usable position and a folded or storage position. Support 173 is pivotally connected to both the leg and to the arm 172. The top of arm 172 contacts the leg when the seat is in the deployed position. The chair is shown in the highest and most rearward position in FIG. 13. Two alternative positions are illustrated in FIG. 13. Those two alternative positions are successively lower and more forward.

A single wheel attachment 200 is further provided, and is shown in FIGS. 1, 4, 5, and 17-18. The attachment 200 has a connector 210, gusset bars 230, a post 240, a handle bar 250 a wheel 260. The handle bar 250 is preferably at the top of the post 240 and the wheel 260 is preferably at the bottom of the post. The gusset bars 230 connect the connector 210 to the post 240. The handle bar and wheel 260 are preferably rotationally connected wherein turning off the bar causes the wheel to turn. The bar can preferably turn 360 degrees as the shaft turns within the post 240. The height of the bars are adjustable.

Connector 210 has a top 211, a bottom 212, and end 213, a second end 214, a side 215 and a second side 216. An extension 217 is at the end 214 of the connector 210. The extension is at the top of the connector 210. Two wings, 218 and 219 are provided. The wings 218 and 219 extend from the bottom sides 215 and 216 of the connector. Wings are preferably shaped divergent from each other in the direction from end 213 to end 214.

The connector 210 is removably connectable to receiver 50 of the base 30. This is accomplished in a manner as illustrated in FIGS. 6-8 and 53. The extension 217 (or bar) of connector passes through the receiver and 210 rests upon the lip 57 of the connector, and the wings 218 and 219 engage the bottom 52 of the receiver when the connector is fully mated with the receiver. The contact between the wings and the bottom of the receiver, as well as the contact between the bar and the lip are maintained by the weight of the scooter and any cargo and passengers on the scooter 20. To remove the attachment 200, the attachment is rotated so that the contacts herein described cease and the attachment 200 and base 30 are separated. It is seen that the scooter 20 is a three wheeled scooter when the attachment 200 is in place.

A double wheel attachment 300 is further provided, and is shown in FIGS. 3, 13 and 19-21. The double wheel attachment 300 has a connector 310, a riser 330, a cross member 340, two casters 350 and 351, respectively, and a bumper 360. It is noted that the connector 310 is structurally and operationally the same as connector 210 described above in as much as it has the same profile, outer perimeter shape, wings and bar. The riser 330 supports cross member 340. Wheels 350 and 351 are preferably castors and are located on each end of the cross member.

A coupler attachment 400 is further provided, and is shown in FIGS. 2, 4-5 and 22-24. The coupler attachment 400 has a connector 410. The connector 410 is similar to the connector 210 in as much as it has the same profile, outer perimeter shape, wings and bar. Connector 410 further has a hole 420 vertically passing there through. A support 430 having an end 431 with a ring 432 is further provided. Ring 432 maintains the height of the support 430 relative the connector 410. A fastener 433 is provided to secure the end 431 to the connector 410. One preferred fastener is a cap and a pin. It is understood that other fasteners may be used without departing from the broad aspects of the present invention. End 431 can rotate upon its axis within hole 420 about axis 434.

The support 430 has a second end 435 having a link 440. The link has a collar 441 that allows the link 440 to rotate about a collar axis 447 relative the end 435. A pin 442 is used to rotationally secure the link 440 in the desired position. A first hook 443 and a second hook 444 are provided. The hooks 443 and 444 are offset different distances from the collar 441. In this regard, the hooks 443 and 444 provide flexibility to connect to adjacent objects having different heights. A gusset 445 provides structural support to hook 444. It is appreciated that while two hooks are illustrated, that additional hooks could be provided or an adjustable hook can be provided without departing from the broad aspects of the present invention.

Figure 23:
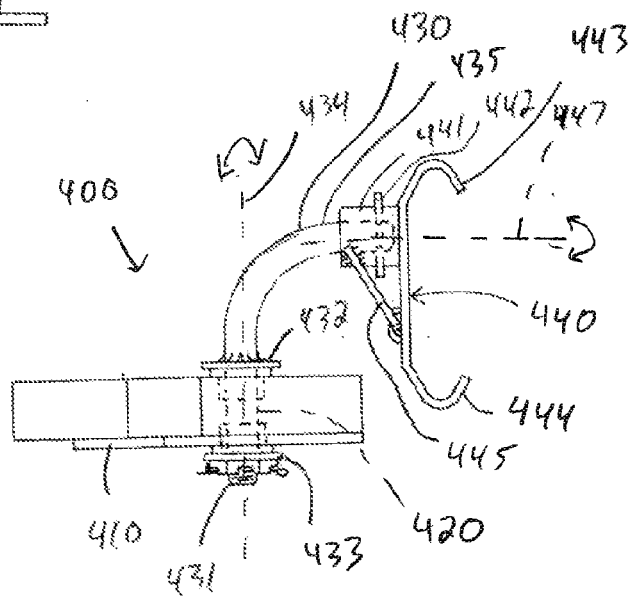
FIG. 23 is a side view of the embodiment illustrated in FIG. 22.
Figure 24:
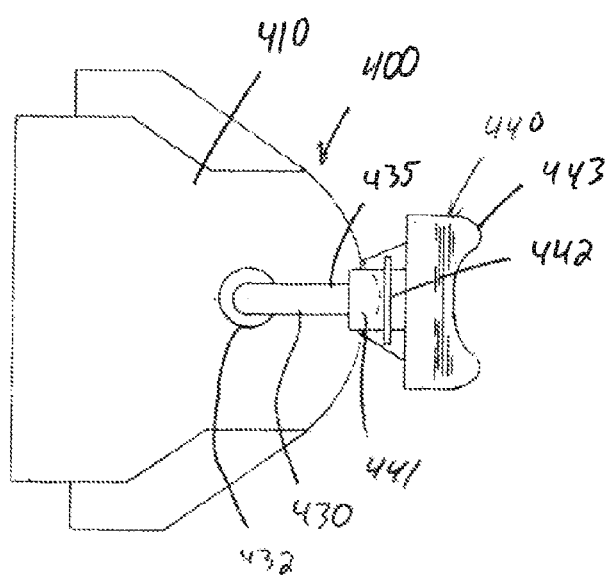
FIG. 24 is a top view of the embodiment illustrated in FIG. 22.

It is preferred that axis 434 is generally perpendicular to axis 447, as seen best in FIG. 23.

Figure 38:
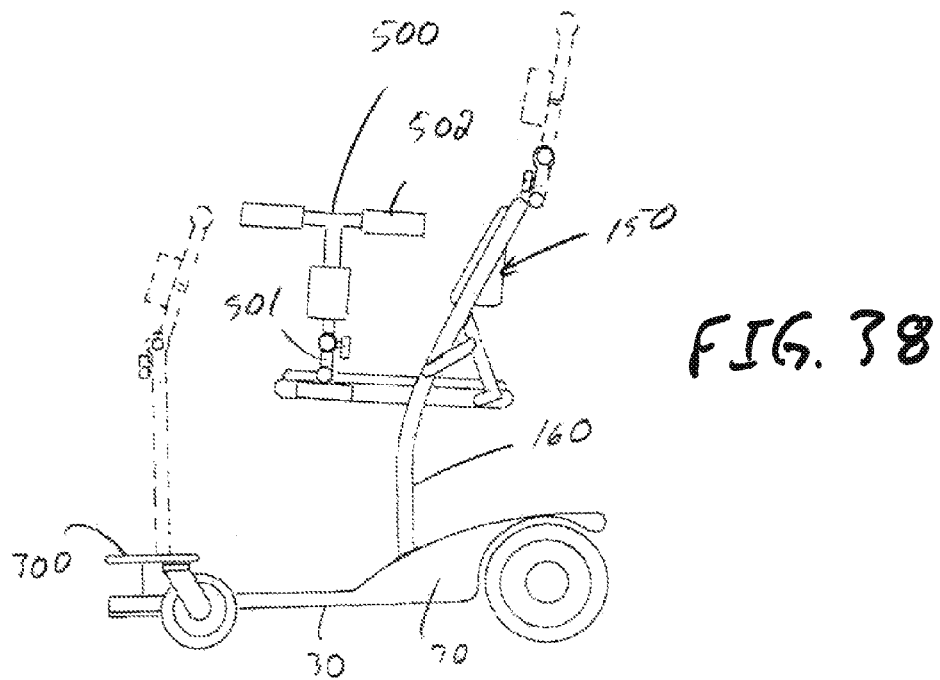
FIG. 38 is a side view of an embodiment of a side rail attachment in one position with other positions shown in phantom lines.
Figure 39:
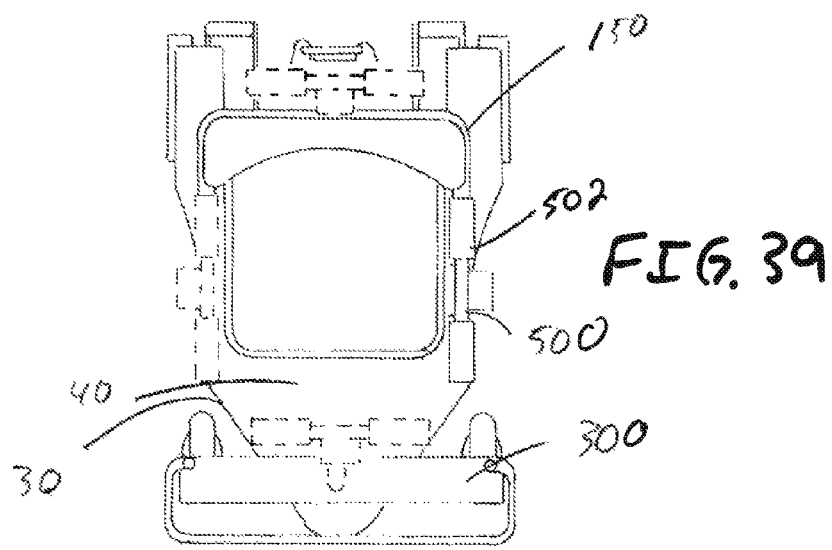
FIG. 39 is a top view of the embodiment illustrated in FIG. 38.

Now looking to FIGS. 38 and 39, it is seen that a straight bar 500 is provided. The straight bar 500 has a clamp 501 and handles 502. Straight bar is illustrated as being attached to one side of a seat. It is shown in phantom lines as alternatively being connected to the other side of the seat, to the front of a double wheel attachment, and to the top of the back support of the seat.

Figure 40:
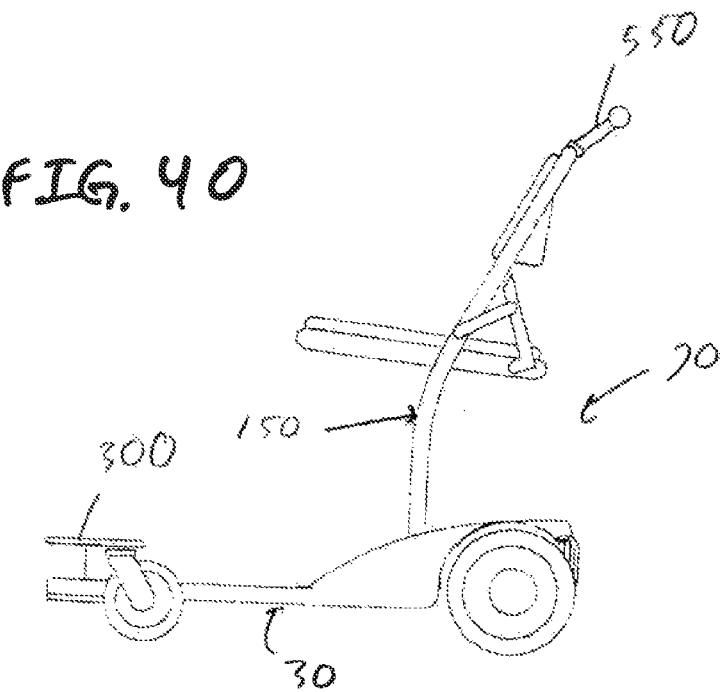
FIG. 40 is a side view showing an embodiment of a push handle.
Figure 41:
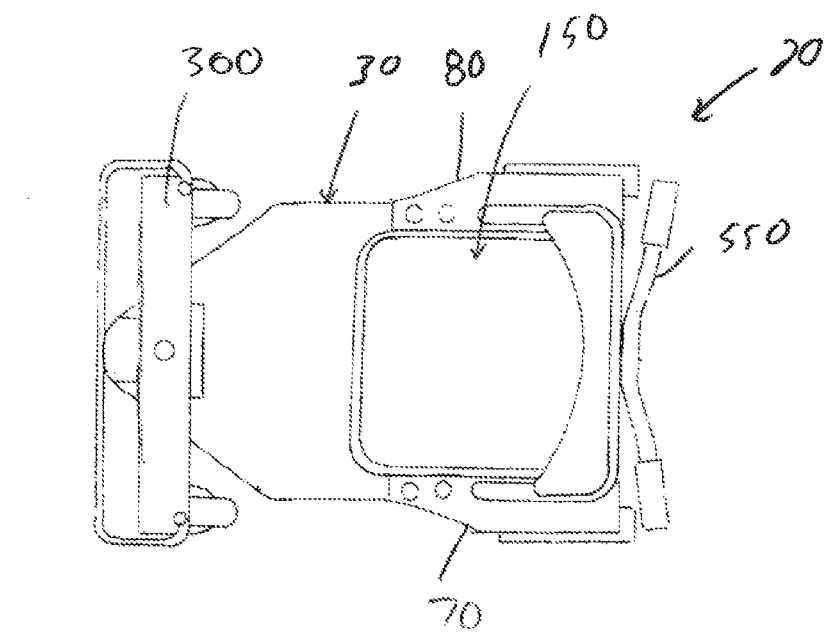
FIG. 41 is a top view of the embodiment illustrated in FIG. 40.

Now looking at FIGS. 40 and 41, it is seen that a handlebar 550 is illustrated as being attached to the top of the seat back support. In this embodiment, the scooter 20 can be unpowered by drive assemblies and instead can be pushed by a person.

Figure 42:
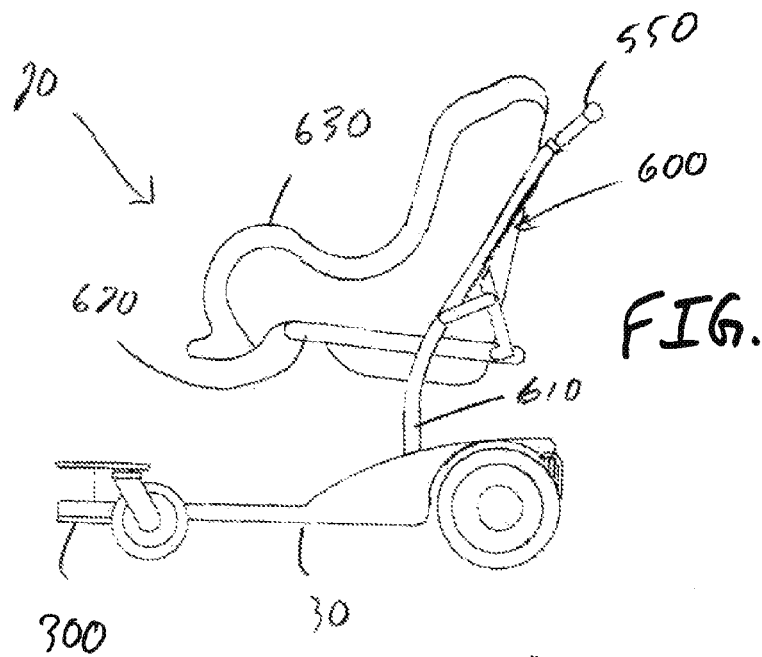
FIG. 42 is a side view showing an embodiment of a car seat holder shown with a push handle attachment.
Figure 43:
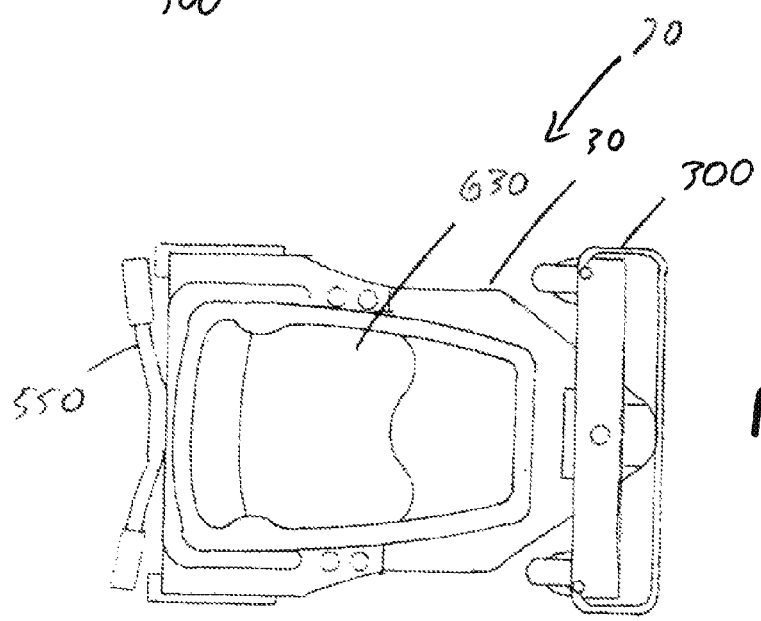
FIG. 43 is a top view of the embodiment illustrated in FIG. 42.

Now looking a FIGS. 42 and 43, it is seen that a car seat holder 600 is provided. The car seat holder 600 has a base frame 610, a seat frame 620 and a car seat 630. The base frame 610 is preferably similar to that of chair 150, and can be removably positioned in the selected riser holes.

Several tandem configurations are illustrated in FIGS. 4-5, 44-45 and 46-47.

Figure 4:
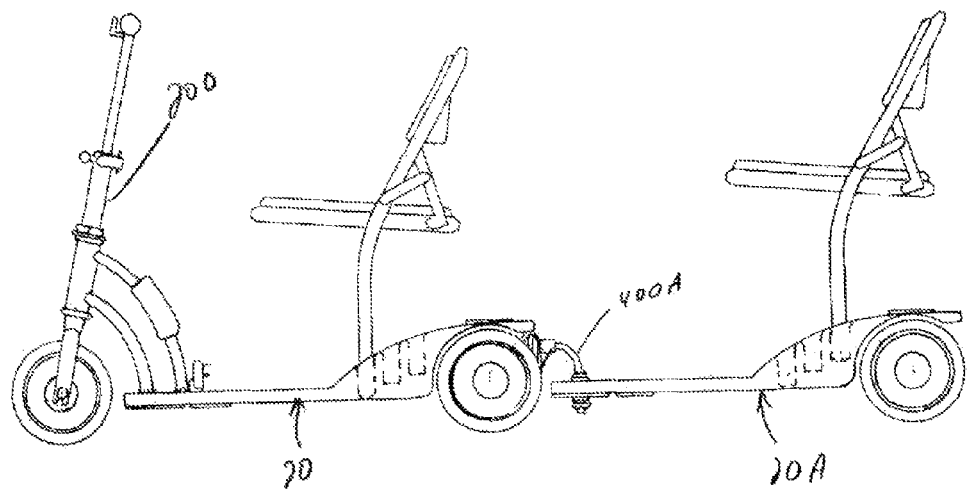
FIG. 4 is a side view of an additional alternative embodiment of the present invention.

In FIGS. 4-5 the front scooter 20 has a single wheel attachment 200 and the rear scooter 20A has a coupler attachment 400A. Both the front and the rear scooters have seats. The front scooter is set up to drive, as it has a throttle and drive assemblies.

Figure 44:
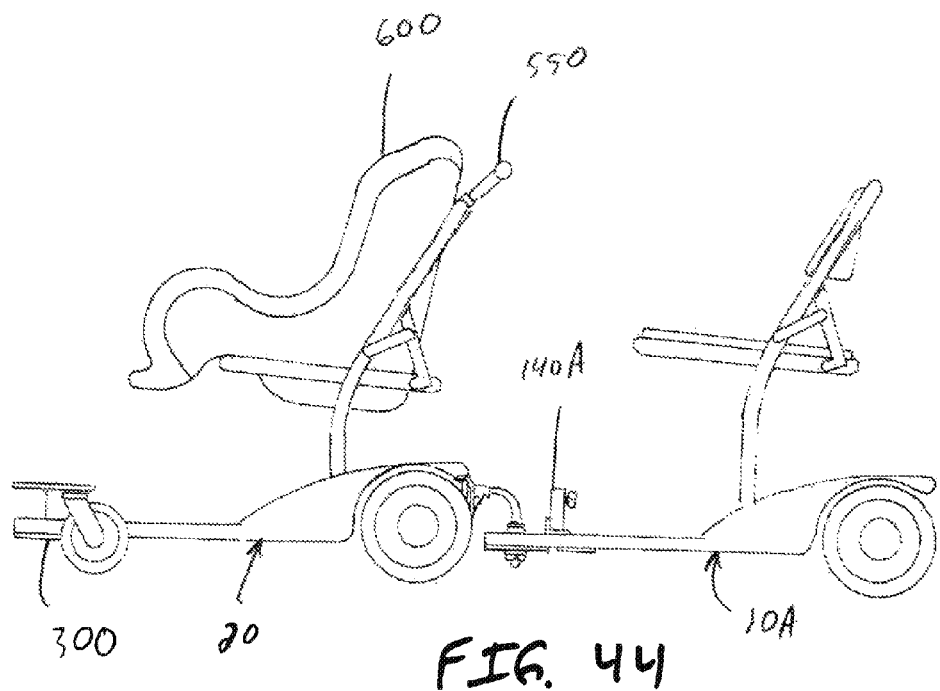
FIG. 44 is a side view of a tandem assembly with the front base having a car seat holder and the rear base having a chair.
Figure 45:
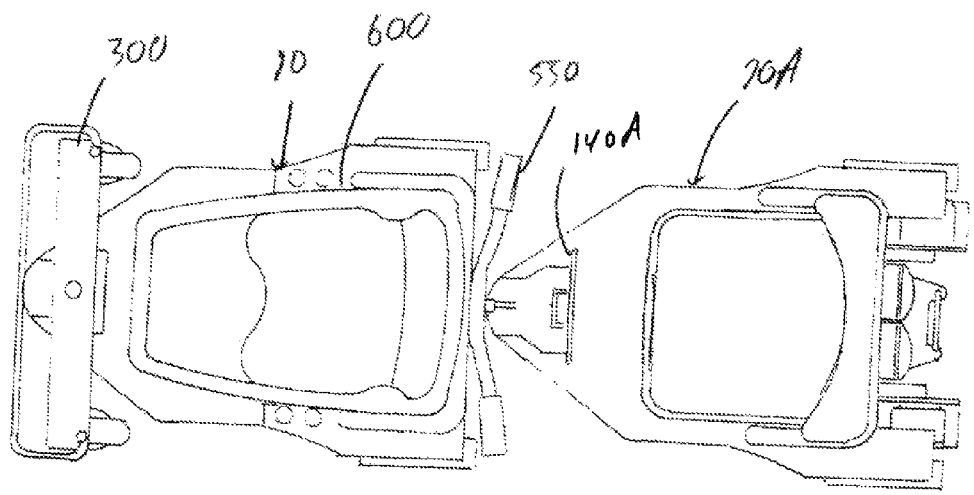
FIG. 45 is a top view of the embodiment illustrated in FIG. 44.

In FIGS. 44-45, the front scooter is set up with a car seat holder 600. The rear scooter has a chair, and is adapted to being driven and controlled via throttle 140A.

Figure 46:
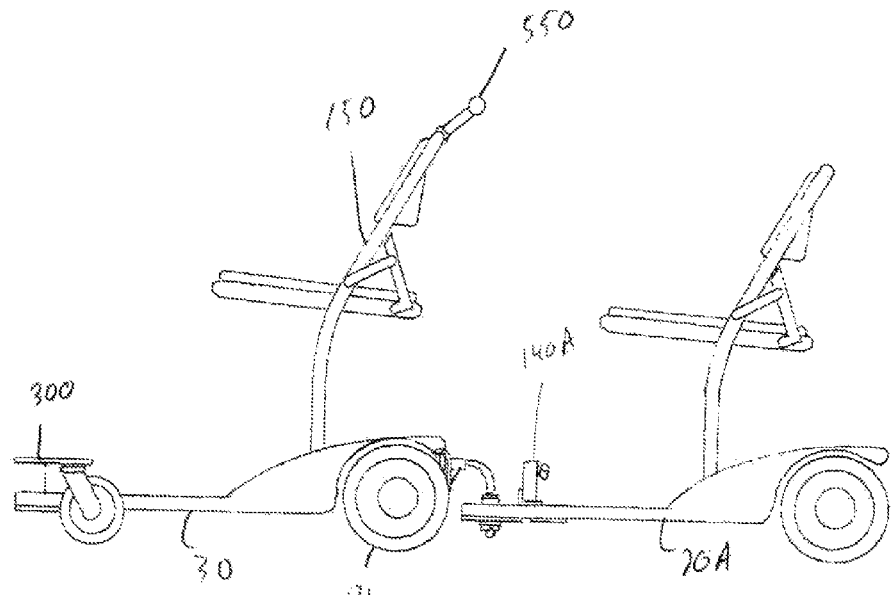
FIG. 46 is a side view of an alternative configuration of the present invention.
Figure 47:
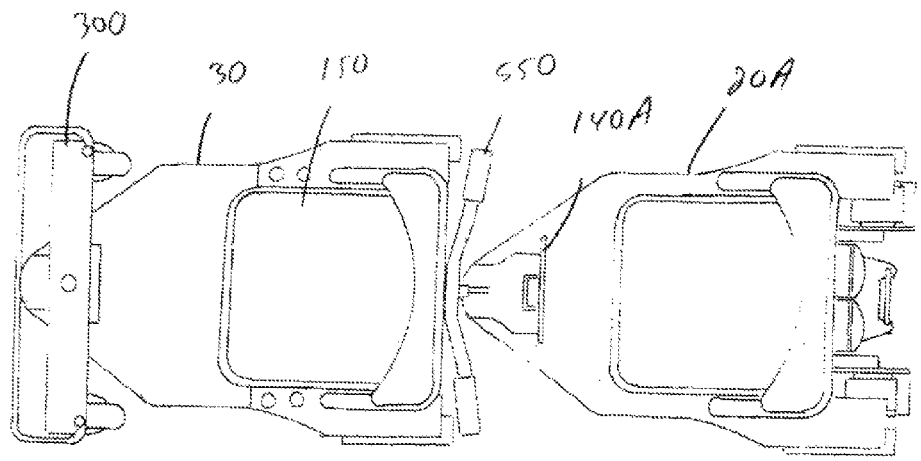
FIG. 47 is a top view of the embodiment illustrated in FIG. 46.

In FIGS. 46-47, the front scooter has a double wheel attachment and the rear scooter has a coupler attachment. A handle bar in on the front scooter. The rear scooter 20A is set up to be driven and controlled via throttle 140A In FIGS. 48-49, the scooter 20 is shown connected to a shopping cart 10. In this regard, the appropriate hook 444 is selected and is mated with the cross bar 13 of the cart 10. The user can then use the scooter 20 to push the cart 10 and the scooter 20. The seat is illustrated in the storage position allowing the user to stand on the platform 40. Further, the seat is shown received within hole 71 of riser resulting is a preferred height of 15 inches. The seat height can be increased (and distance to the front of the scooter increased) be selecting a different hole in the riser.

Thus it is apparent that there has been provided, in accordance with the invention, mobility scooter that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A scooter comprising:
   a base with a platform with a platform front, said base further having a receiver at said platform front, and said base having a riser with a plurality of holes, said plurality of holes being longitudinally and vertically offset;
   a connector, said connector being removably connected to said receiver; and
   a chair, wherein said chair is removably connectable to one of said plurality of holes whereby said chair is selectably positioned longitudinally and vertically relative to the base.

2. The scooter of claim 1 wherein said base has a weight and the connection between said connector and said receiver is maintained by said weight of said base.

3. The scooter of claim 1 wherein said connector is a single wheel attachment.

4. The scooter of claim 1 wherein said connector is a two wheel attachment.

5. The scooter of claim 1 wherein said connector is a coupler.

6. The scooter of claim 5 wherein said coupler has an adjustable height.

7. The scooter of claim 6 wherein said coupler has a pin wherein said coupler is swivelable relative the pin and said coupler further has a first hook and a second hook, said first hook being a different distance from said pin as said second hook.

8. The scooter of claim 1 wherein said chair folds flat.

9. The scooter of claim 1 wherein said base has a back and said scooter further comprises a hitch located at said back of said base.

10. The scooter of claim 1 further comprising a throttle, said throttle being a movable throttle.

11. The scooter of claim 1 further comprising:
    a first wheel;
    a second wheel;
    a first drive assembly powering said first wheel; and
    a second drive assembly powering said second wheel,
    wherein said first drive assembly is independent of said second drive assembly.

12. The scooter of claim 11 wherein:
    said first wheel has a first wheel gear; and
    said first drive assembly has a first drive assembly gear,
    wherein said first drive assembly gear engages said first wheel gear.

13. The scooter of claim 1 wherein said platform front is tapered.

14. A scooter comprising:
    a base with a platform with a platform front, said base further having a receiver at said platform front; said receiver having a receiver neck, a receiver bottom and a lip on said receiver bottom; and
    a connector, said connector being removably connected to said receiver and having an extension that is engageable with said lip and wings that removeably engage said receiver bottom.

15. The scooter of claim 14 wherein said connector has a first hook and a second hook, and is swivelable whereby said first hook or said second hook is operable.

16. The scooter of claim 14 further comprising a hitch.

17. A scooter comprising:
    a base with a platform and a riser, said riser having a plurality of holes that are longitudinally and vertically spaced; and
    a chair connected to said riser, wherein said chair is longitudinally and vertically adjustable relative to said base.

18. The scooter of claim 17 wherein:
    said base has a second riser; and
    said chair folds flat.

* * * * *